1048B2

United States Patent
Liu et al.

(10) Patent No.: US 11,601,048 B2
(45) Date of Patent: Mar. 7, 2023

(54) RESONANT SWITCHING POWER CONVERTER

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPOATION, Zhubei (TW)

( * ) Notice: Subject to any disclaimer, the term of this patent is extended or adjusted under 35 U.S.C. 154(b) by 127 days.

(21) Appl. No.: 17/361,866

(22) Filed: Jun. 29, 2021

(65) Prior Publication Data

US 2022/0029531 A1 Jan. 27, 2022

Related U.S. Application Data

(60) Provisional application No. 63/056,544, filed on Jul. 24, 2020.

(30) Foreign Application Priority Data

Nov. 5, 2020 (TW) .................................. 109138686

(51) Int. Cl.
*H02M 3/00* (2006.01)
*H02M 3/07* (2006.01)

(52) U.S. Cl.
CPC .................................... *H02M 3/07* (2013.01)

(58) Field of Classification Search
CPC ........ H02M 3/07; H02M 1/0058; H02M 1/32; H02M 1/36; H02M 3/01
See application file for complete search history.

(56) References Cited

U.S. PATENT DOCUMENTS 9,337,744 B1 * 5/2016 Tsyrganovich ..... H02M 1/4208
10,340,794 B1 * 7/2019 Zhang ..................... H02M 1/32

* cited by examiner

*Primary Examiner* — Adolf D Berhane
*Assistant Examiner* — Afework S Demisse
(74) *Attorney, Agent, or Firm* — Tung & Associates

(57) ABSTRACT

A resonant switching power converter includes: capacitors, switches, at least one charging inductor, at least one discharging inductor and a pre-charging circuit. The pre-charging circuit controls a first switch of the switches when the resonant switching power converter operates in a pre-charging mode, to control an electrical connection relationship between the input voltage and a first capacitor of the capacitors and to control other capacitors of the capacitors, thus controlling the capacitors to be connected in parallel to one another or to be connected in series to one another, so that when a voltage drop across the first capacitor is lower than a predetermined voltage, the voltage drop across each capacitor is charged to the predetermined voltage. After operating in the pre-charging mode, the resonant switching power converter subsequently operates in a resonant voltage conversion mode, to thereby convert an input voltage to an output voltage.

19 Claims, 14 Drawing Sheets

RESONANT SWITCHING POWER CONVERTER

CROSS REFERENCE

The present invention claims priority to U.S. 63/056,544 filed on Jul. 24, 2020 and claims priority to TW 109138686 filed on Nov. 5, 2020.

BACKGROUND OF THE INVENTION

Field of Invention

The present invention relates to a resonant switching power converter; particularly, it relates to such resonant switching power converter capable of executing pre-charging operation.

Description of Related Art

Please refer to FIG. 1, which shows a schematic diagram of a conventional power converter. Under a charging operation, switches Q1, Q2, Q3 and Q4 are ON, whereas, switches Q5, Q6, Q7, Q8, Q9 and Q10 are OFF, so that a series connection of a capacitor C1, a capacitor C2 and a capacitor C3 is formed between an input voltage Vin and an output voltage Vout. On the other hand, under a discharging operation, switches Q5, Q6, Q7, Q8, Q9 and Q10 are ON, whereas, switches Q1, Q2, Q3 and Q4 are OFF, so that a parallel connection of the capacitor C1, the capacitor C2 and the capacitor C3 is formed between the ground voltage level and the output voltage Vout. The capacitors of such conventional power converter will suffer high inrush current when the switches Q1-Q10 are switching.

In view of the above, to overcome the drawback in the prior art, the present invention proposes an innovated power converter.

SUMMARY OF THE INVENTION

From one perspective, the present invention provides a resonant switching power converter, which is configured to operably convert an input voltage to an output voltage; the resonant switching power converter comprising: a plurality of capacitors; a plurality of switches, which are coupled to the plurality of capacitors, wherein the plurality of switches are configured to operably switch electrical connection relationships of the plurality of capacitors; at least one charging inductor, which is connected in series to at least one of the plurality of capacitors; at least one discharging inductor, which is connected in series to at least one of the plurality of capacitors; and a pre-charging circuit, wherein when the resonant switching power converter operates in a pre-charging mode, the pre-charging circuit being configured to operably control a first switch of the plurality of switches, so as to control an electrical connection relationship between the input voltage and a first capacitor of the plurality of capacitors, and being configured to operably control other switches of the plurality of switches, so as to control the plurality of capacitors to be connected in parallel to one another or to be connected in series to one another, so that when a voltage drop across the first capacitor is lower than a predetermined voltage, a voltage drop across each capacitor is charged to the predetermined voltage; wherein the first switch is electrically connected between the input voltage and the first capacitor; wherein in a resonant voltage conversion mode, a charging operation signal and at least one discharging operation signal are generated to operate the plurality of switches, so as to switch electrical connection relationships of the plurality of capacitors, such that after the pre-charging mode ends, the resonant switching power converter subsequently operates in the resonant voltage conversion mode to convert the input voltage to the output voltage; wherein in the resonant voltage conversion mode, the charging operation signal and the at least one discharging operation signal have respective ON periods which do not overlap one another, so that a charging process and at least one discharging process do not overlap each other; wherein in the charging process, the charging operation signal is configured to operably control the plurality of switches, so that a series connection of the plurality of capacitors and the at least one charging inductor is formed between the input voltage and the output voltage, to form a charging path; wherein in the at least one discharging process, the at least one discharging operation signal is configured to operably control the plurality of switches, so that a series connection of each capacitor and one of the at least one discharging inductor is formed between the output voltage and a ground voltage level, to simultaneously or sequentially form a plurality of discharging paths; wherein the charging process and the at least one discharging processes are arranged in a repeated, alternating manner, so as to convert the input voltage to the output voltage.

In one embodiment, the predetermined voltage is a target voltage of the output voltage.

In one embodiment, the pre-charging circuit includes: an amplifier circuit, which is configured to operably generate an error amplification signal according to a voltage at a switch output end of the first switch and a rising ramp signal, wherein the switch output end is electrically connected to the first capacitor; a ramp circuit, which is configured to operably generate the rising ramp signal; and a pre-charging control circuit, which is configured to operably generate a pre-charging signal according to the error amplification signal, so as to control the first switch, so that in the pre-charging mode, each capacitor is charged to the predetermined voltage according to a rising speed of the rising ramp signal.

In one embodiment, the pre-charging circuit further includes: a pre-discharging circuit, which is configured to operably discharge each capacitor to the predetermined voltage in a case where the voltage drop across the first capacitor is greater than the predetermined voltage.

In one embodiment, the pre-charging circuit further includes: a voltage detection circuit, which is coupled between the pre-charging control circuit and the input voltage and which is configured to operably detect the input voltage, wherein when the input voltage is greater than a reference voltage, the voltage detection circuit is configured to operably enable the pre-charging control circuit, so as to actuate the pre-charging mode.

In one embodiment, the at least one charging inductor is one single charging inductor and the at least one discharging inductor is one single discharging inductor.

In one embodiment, the inductance of the one single charging inductor is the same as the inductance of the one single discharging inductor.

In one embodiment, the at least one charging inductor and the at least one discharging inductor is one same single inductor.

In one embodiment, the charging process has a charging resonant frequency, whereas, the discharging process has a discharging resonant frequency, and wherein the charging resonant frequency is the same as the discharging resonant frequency.

In one embodiment, the charging process has a charging resonant frequency, whereas, the discharging process has a discharging resonant frequency, and wherein the charging resonant frequency is different from the discharging resonant frequency.

In one embodiment, the resonant switching power converter is a bidirectional resonant switching power converter.

In one embodiment, a voltage conversion ratio of the input voltage to the output voltage of the resonant switching power converter is adjustable to be 4:1, 3:1 or 2:1.

In one embodiment, the predetermined voltage has a constant ratio to the input voltage.

From another perspective, the present invention provides a resonant switching power converter, which is configured to operably convert an input voltage to an output voltage; the resonant switching power converter comprising: at least one resonator, wherein the at least one resonator includes a resonant capacitor and a resonant inductor which are connected in series to each other; a plurality of switches, which are coupled to the at least one resonator, wherein in a resonant voltage conversion mode, the plurality of switches are configured to operably switch electrical connection relationships of the at least one resonator according to a first resonant operation signal and a second resonant operation signal in correspondence to a first resonant process and a second resonant process, respectively; wherein in the first resonant process, a resonant charging operation is performed on the at least one resonator, and wherein in the second resonant process, a resonant discharging operation is performed on the at least one resonator; at least one non-resonant capacitor, which is coupled to the at least one resonator and whose electrical connection relationship with the at least one resonator is controlled according to the first resonant operation signal and the second resonant operation signal in the resonant voltage conversion mode, wherein a voltage across the at least one non-resonant capacitor has a constant ratio to the input voltage; and a pre-charging circuit, wherein when the resonant switching power converter operates in a pre-charging mode, the pre-charging circuit being configured to operably control a first switch of the plurality of switches so as to control an electrical connection relationship between the input voltage and the at least one resonator, and being configured to operably control other switches of the plurality of switches so as to control the electrical connection relationship between the at least one resonator and the at least one non-resonant capacitor in a plurality of sub-pre-charging stages in the pre-charging mode, so that the resonant capacitor and the at least one non-resonant capacitor are charged to respective predetermined voltages; wherein the first switch is electrically connected between the input voltage and the first capacitor; wherein in the resonant voltage conversion mode, the first resonant operation signal and the second resonant operation signal have respective ON periods which do not overlap one another, so that the first resonant process and the second resonant process do not overlap each other; wherein after the pre-charging mode ends, the resonant switching power converter subsequently operates in the resonant voltage conversion mode, wherein the first resonant process and the second resonant process are arranged in a repeated, alternating manner, so as to convert the input voltage to the output voltage.

In one embodiment, the pre-charging circuit includes: an amplifier circuit, which is configured to operably generate an error amplification signal according to a voltage at a switch output end of the first switch and a rising ramp signal, wherein the switch output end is electrically connected to the resonant capacitor; a ramp circuit, which is configured to operably generate the rising ramp signal; and a pre-charging control circuit, which is configured to operably generate a pre-charging signal according to the error amplification signal, to control the first switch, so that in the plurality of sub-pre-charging stages in the pre-charging mode, the resonant capacitor and the at least one non-resonant capacitor are charged to the respective predetermined voltages according to a rising speed of the rising ramp signal.

In one embodiment, the pre-charging circuit further includes: a voltage detection circuit, which is coupled between the pre-charging control circuit and the input voltage and which is configured to operably detect the input voltage, wherein when the input voltage is greater than a reference voltage, the voltage detection circuit is configured to operably enable the pre-charging control circuit, so as to actuate the pre-charging mode.

Advantages of the present invention include: that the present invention can execute pre-charging operation and hot-swapping operation without requiring an additional hot-swapping switch and an additional hot-swapping controller.

Further advantages of the present invention include: that the present invention can achieve soft starting without requiring an additional upstream voltage regulator; and that the present invention can reduce unwanted inrush current.

Still other advantages of the present invention include: that the present invention can reduce voltage stress; and that the present invention can support a parallel operation, suitable to be applied in a multiphase resonant switched-capacitor converter (RSCC).

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
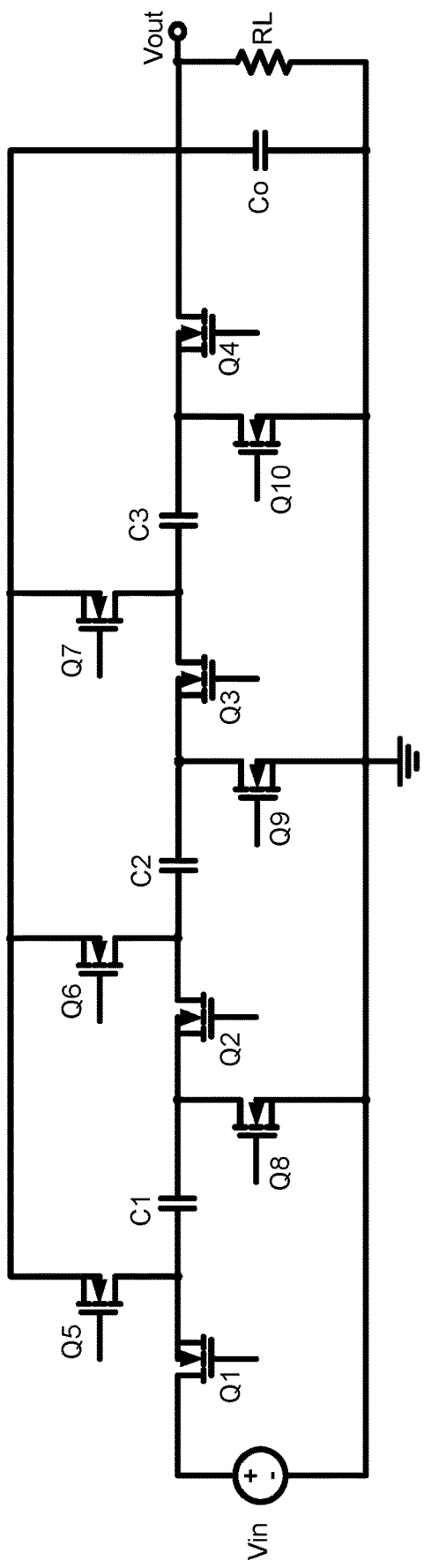
FIG. 1 shows a schematic diagram of a conventional power converter.
Figure 2:
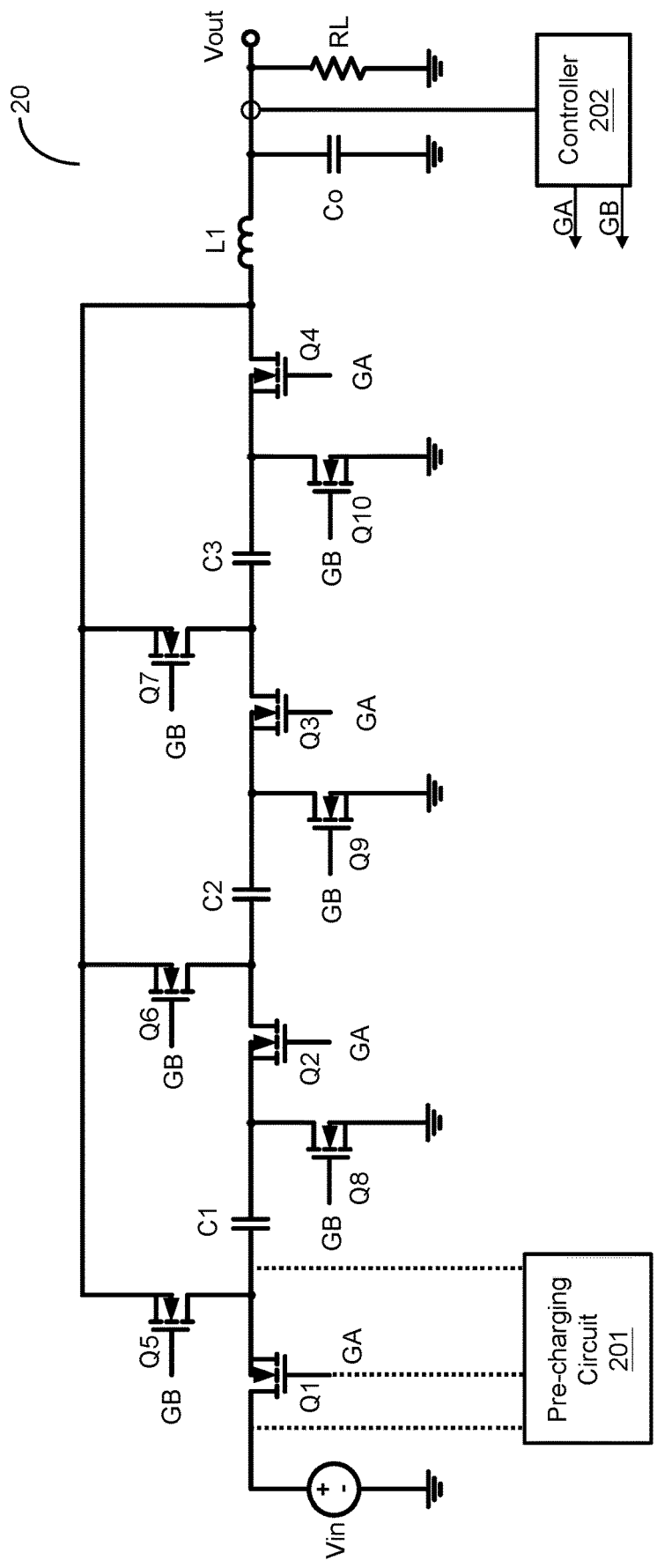
FIG. 2 shows a schematic circuit diagram of a resonant switching power converter according to an embodiment of the present invention.

Please refer to FIG. 2, which shows a schematic circuit diagram of a resonant switching power converter according to an embodiment of the present invention. As shown in FIG. 2, the resonant switching power converter 20 of the present invention comprises: capacitors C1, C2 and C3, switches Q1, Q2, Q3, Q4, Q5, Q6, Q7, Q8, Q9 and Q10, an inductor L1, a pre-charging circuit 201 and a controller 202. The switches Q1, Q2 and Q3 are connected in series to the capacitors C1, C2 and C3, respectively. The switch Q4 is connected in series to the inductor L1. However, it should be understood that the implementation of the number of the capacitor of the resonant switching power converter 20 as three in the above-mentioned preferred embodiment is only an illustrative example, but not for limiting the broadest scope of the present invention. In other embodiments, it is also practicable and within the scope of the present invention that the number of the capacitors of the resonant switching power converter 20 can be any plural number other than three. It should be understood that the number of a device in the above-mentioned preferred embodiment, unless emphasized as a feature, is only given as an illustrative example. In one embodiment, the inductor L1 can be, for example but not limited to, a variable inductor.

As shown in FIG. 2, in one embodiment, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 2, the other ends of the switches Q5-Q7 are commonly electrically connected to a node which is connected in series to a node between the switch Q4 and the inductor L3. The other ends of the switches Q8-Q10 are commonly coupled to a ground voltage level. The other end of the inductor L1 is coupled to an output voltage Vout. The other end of the switch Q1 is coupled to an input voltage Vin. The pre-charging circuit 201 is coupled to a node between the switch Q1 and the capacitor C1, a node between the input voltage Vin and the switch Q1, and a gate of the switch Q1. In the context of the present invention, a transistor switch is regarded as a two-end device, wherein its gate is regarded as a control terminal, not an "end".

The pre-charging circuit 201 is configured to operably control the switch Q1 in a case where the resonant switching power converter 20 operates in a pre-charging mode, so as to control an electrical connection relationship between the input voltage Vin and the capacitor C1 and is configured to operably control the other switches Q2-Q10, so as to control the capacitors C1-C3 to be connected in parallel to one another or to be connected in series to one another, so that when a voltage drop across the capacitor C1 is lower than a predetermined voltage, each capacitor C1-C3 is charged to the predetermined voltage.

In one embodiment, the above-mentioned predetermined voltage has a constant ratio to the input voltage Vin. In one embodiment, the above-mentioned predetermined voltage is a target voltage of the output voltage Vout. Such target voltage can be, for example but not limited to, ¼ of the input voltage Vin. In one embodiment, to achieve the above-mentioned configuration of connecting the capacitors C1-C3 in series to one another, the switches Q2-Q4 are ON, while the switches Q5-Q10 are OFF, thus controlling the capacitors C1-C3 to be connected in series to one another; to achieve the above-mentioned configuration of connecting the capacitors C1-C3 in parallel to one another, the switches Q5-Q10 are ON, while the switches Q2-Q4 are OFF, thus controlling the capacitors C1-C3 to be connected in parallel to one another.

In one embodiment, after the resonant switching power converter 20 ends operating in the pre-charging mode, the resonant switching power converter 20 will subsequently operate in a resonant voltage conversion mode, to thereby convert the input voltage Vin to the output voltage Vout. In the resonant voltage conversion mode, the controller 202 is configured to operably generate a charging operation signal GA corresponding to a charging process and a discharging operation signal GB corresponding to a discharging process, so as to operate the switches Q1-Q10 in the resonant voltage conversion mode to switch electrical connection relationships of the capacitors C1-C3. In one embodiment according to the present invention, the entire circuit of the resonant switching power converter 20 shown in the figure (except the input voltage Vin) can support hot-swapping operation.

The pre-charging mode is for pre-charging the capacitors C1-C3 to the predetermined voltage before the resonant switching power converter 20 operates in the resonant voltage conversion mode, in order to avoid unwanted inrush current. The charging operation signal GA and the discharging operation signal GB shown in FIG. 2 are for use in the resonant voltage conversion mode. In the pre-charging mode, the switches operate as described previously and do not operate according to the charging operation signal GA and the discharging operation signal GB.

Figure 3:
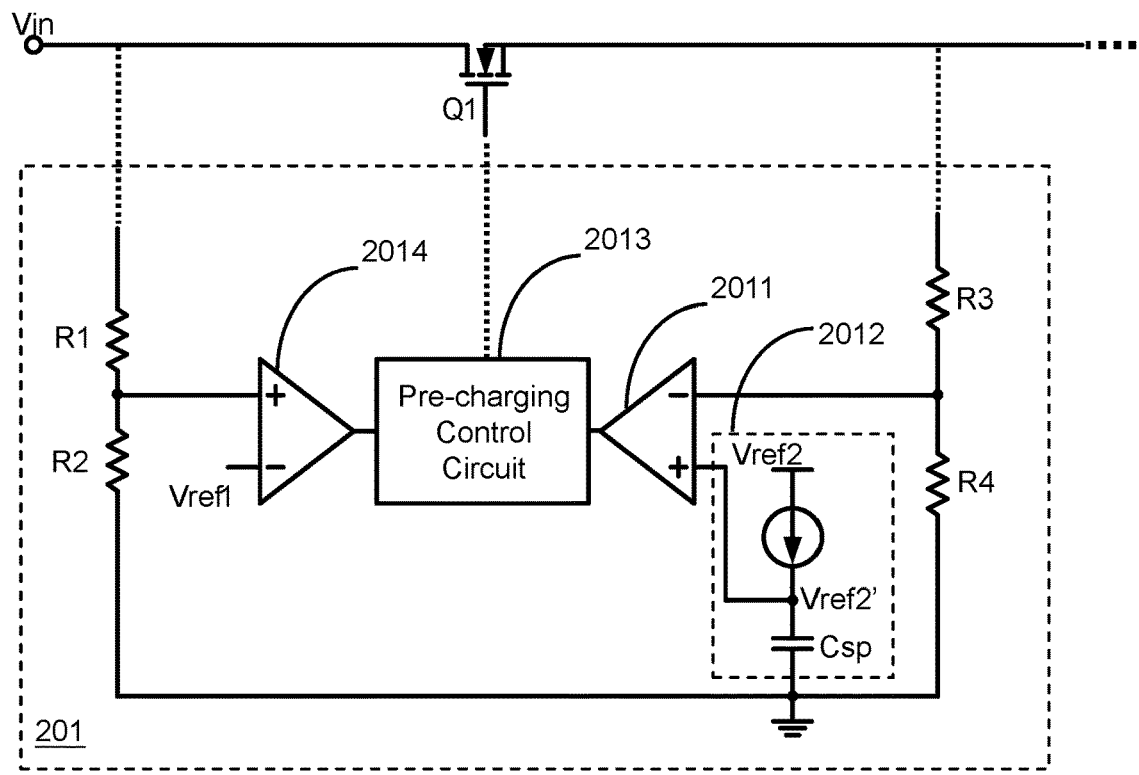
FIG. 3 shows a schematic circuit diagram of an embodiment of a pre-charging circuit in a resonant switching power converter according to the present invention.

Please refer to FIG. 3, which shows a schematic circuit diagram of an embodiment of a pre-charging circuit in a resonant switching power converter according to the present invention. As shown in FIG. 3, in one embodiment, the pre-charging circuit includes: an amplifier circuit 2011, a ramp circuit 2012, a pre-charging control circuit 2013 and a voltage detection circuit 2014. The amplifier circuit 2011 generates an error amplification signal according to a voltage at a switch output end of the switch Q1 and a rising ramp signal, wherein the switch output end is electrically connected to the capacitor C1. An inverse end of the amplifier circuit 2011 is coupled to a node between the capacitor C1 and the switch Q1 via a voltage divider resistor R3, whereas, a non-inverse end of the amplifier circuit 2011 is coupled to the ramp circuit 2012. The ramp circuit is configured to operably generate the rising ramp signal. In one embodiment, the ramp circuit 2012 comprises a current source, wherein the current source is configured to operably charge a capacitor Csp, to increase a voltage Vref2' at a high-voltage side node of the capacitor Csp. The pre-charging control circuit 2013 is coupled to an input end of the switch Q1, an output end of the voltage detection circuit 2014, and an output end of the amplifier circuit 2011. The pre-charging control circuit 2013 is configured to operably generate a pre-charging signal according to the error amplification signal, to control the switch Q1, so that in the pre-charging mode, the capacitors C1-C3 are charged to the predetermined voltage according to a rising speed of the rising ramp signal. The voltage detection circuit 2014 is coupled between the pre-charging control circuit 2013 and the input voltage Vin and is configured to operably detect the input voltage Vin. When the input voltage Vin is greater than a reference voltage Vref1, the voltage detection circuit 2014 is configured to operably enable the pre-charging control circuit 2013, so as to actuate the pre-charging mode. The voltage detection circuit 2014 is coupled to the input voltage Vin via a voltage divider resistor R1.

Figure 4:
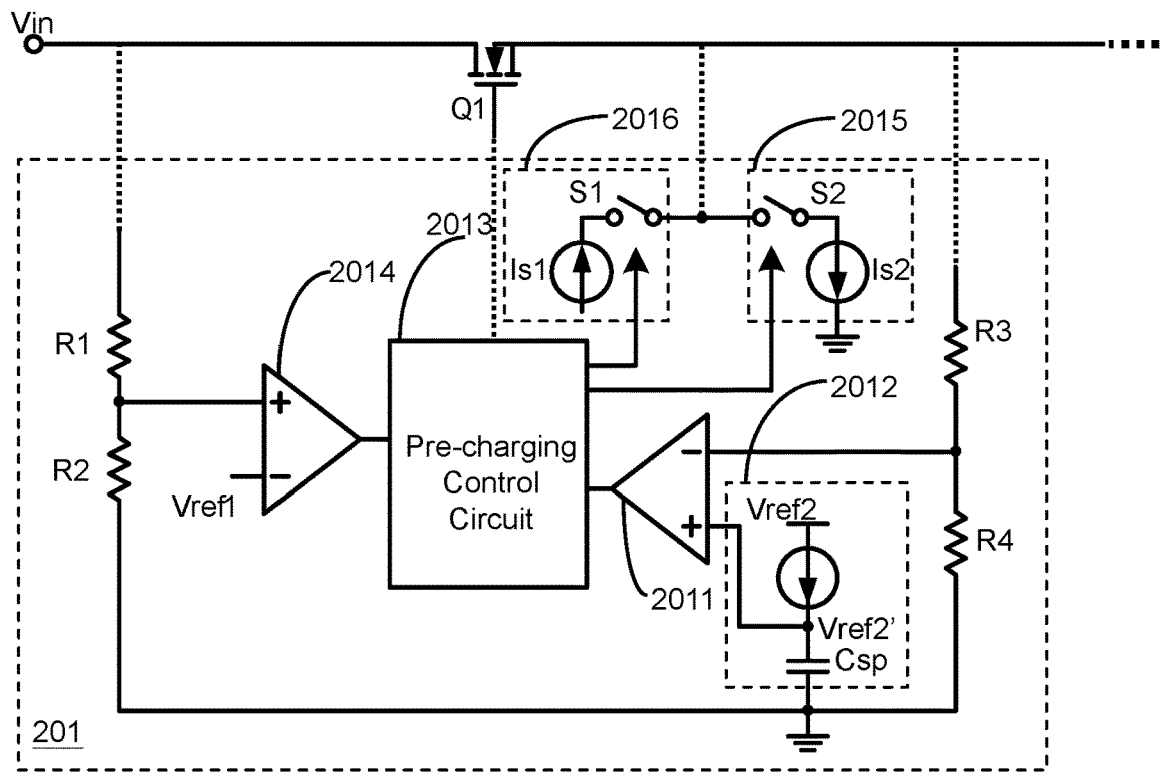
FIG. 4 shows a schematic circuit diagram of another embodiment of a pre-charging circuit in a resonant switching power converter according to the present invention.

Please refer to FIG. 4, which shows a schematic circuit diagram of another embodiment of a pre-charging circuit in a resonant switching power converter according to the present invention. As shown in FIG. 4, in one embodiment, the pre-charging circuit 201 further includes a pre-discharging circuit 2015. The pre-discharging circuit 2015 is configured to operably discharge the capacitors C1-C3 to the predetermined voltage in a case where the voltage drop across the capacitor C1 is greater than the predetermined voltage. The pre-discharging circuit 2015 comprises: a current source Is2 and a switch S2. When the pre-discharging circuit 2015 receives an instruction signal issued from the pre-charging control circuit 2013, the switch S2 is turned ON, whereby the current source Is2 discharges the capacitors C1-C3. In one embodiment, the pre-charging circuit 201 further includes a charging circuit 2016. The charging circuit 2016 is configured to operably charge the capacitors C1-C3. The charging circuit 2016 comprises: a current source Is1 and a switch S1. When the charging circuit 2016 receives an instruction signal issued from the pre-charging control circuit 2013, the switch S1 is turned ON, whereby the current source Is1 charges the capacitors C1-C3. The charging circuit 2016 provides a function of soft starting the resonant switching power converter 20, thus preventing unwanted inrush current from occurring when the resonant switching power converter 20 starts operation, and also provides a function of controlling the voltage rising curve. Note that when unwanted inrush current occurs, an over-current protection function of the resonant switching power converter 20 may be triggered, whereby the power supply may stop functioning. The soft-starting function of the charging circuit 2016 can solves this issue. The configurations of the amplifier circuit 2011, the ramp circuit 2012, the pre-charging control circuit 2013 and the voltage detection circuit 2014 shown in FIG. 4 are implemented in a similar manner as the amplifier circuit 2011, the ramp circuit 2012, the pre-charging control circuit 2013 and the voltage detection circuit 2014 shown in FIG. 3, so the details thereof are not redundantly repeated here.

Please refer to FIG. 2. After the pre-charging mode ends, the resonant switching power converter 20 will subsequently operate in the resonant voltage conversion mode. In the resonant voltage conversion mode, the switches Q1-Q10 are controlled to switch electrical connection relationships between the capacitors C1-C3 and the inductor L1 according to the charging operation signal GA and the discharging operation signal GB generated by the controller 202. In a charging process of the resonant voltage conversion mode, according to the charging operation signal GA, the switches Q1-Q4 are controlled to be ON, whereas, the switches Q5-Q10 are controlled to be OFF, so that a series connection of the capacitors C1-C3 and the inductor L1 is formed between the input voltage Vin and the output voltage Vout, which forms a charging path. In a discharging process of the resonant voltage conversion mode, according to discharging operation signals GB, the switches Q5-Q10 are controlled to be ON, whereas, the switches Q1-Q4 are controlled to be OFF, so that the capacitors C1-C3 form a parallel circuit and the parallel circuit of the capacitors C1-C3 is connected in series to the inductor L1, to form plural discharging paths. It is noteworthy that, in one embodiment, the above-mentioned charging process of the resonant voltage conversion mode and the above-mentioned discharging process of the resonant voltage conversion mode are arranged at different periods in a repeated, alternating manner, to convert the input voltage Vin to an output voltage Vout. That is, the above-mentioned charging process of the resonant voltage conversion mode and the above-mentioned discharging process of the resonant voltage conversion mode are not performed at the same time. In this embodiment, the DC bias voltages of the capacitors C1, C2 and C3 all have a level of Vo. Hence, the capacitors C1, C2 and C3 of the present invention will only need to withstand a relatively lower rated voltage. Hence, the present invention can use capacitors having a smaller size.

In one embodiment, because the charging operation signal GA switches its level when a current flowing through the inductor L1 is approximately zero, the switches Q1-Q4 can be switched at a time point at which the currents flowing through the switches Q1-Q4 are at a relatively lower level of their respective positive half waves, so that soft switching can be achieved. In one embodiment, zero current switching (ZCS) can be achieved. In one embodiment, the duration period of the above-mentioned charging process is smaller than a specific ratio of cycle period by a predetermined period. For example, the duration period of the above-mentioned charging process is smaller than 25% of the cycle period (i.e., duty ratio=25%) by a predetermined period. Thus, after the switches Q1-Q4 have been turned OFF, a little amount of current remains, which flows through the inductor L1 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted, to achieve zero voltage switching (ZVS). On the other hand, in one embodiment, the duration period of the above-mentioned discharging process is greater than a specific ratio of cycle period by a predetermined period. For example, the duration period of the above-mentioned discharging process is greater than 75% of the cycle period (i.e., duty ratio=75%) by a predetermined period. Thus, during the delayed turned-OFF period of the switches Q5-Q10, a negative current of the inductor L1 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted, to achieve zero voltage switching (ZVS).

In one embodiment, the above-mentioned resonant switching power converter 20 can be a bidirectional resonant switching power converter. As one having ordinary skill in the art readily understands, in a "bidirectional resonant switching power converter", the input terminal (which is coupled to the input voltage Vin) and the output terminal (which is coupled the output voltage Vout) are interchangeable. That is, in the embodiment shown in FIG. 2, the resonant switching power converter 20 can convert the output voltage Vout to the input voltage Vin. In one embodiment, a voltage conversion ratio of the input voltage Vin to the output voltage Vout of the above-mentioned resonant switching power converter 20 is 4:1, 3:1 or 2:1. In one embodiment, a voltage conversion ratio of the above-mentioned resonant switching power converter 20 is adjustable. For example, in the charging process of the resonant voltage conversion mode and in the discharging process of the resonant voltage conversion mode, through keeping the switch Q7 to be always ON while keeping the switches Q4 and Q10 to be always OFF, a voltage conversion ratio of the resonant switching power converter 20 can be adjusted to be 3:1. For another example, in the charging process of the resonant voltage conversion mode and in the discharging process of the resonant voltage conversion mode, through keeping the switch Q6 to be always ON while keeping the switches Q9, Q3, Q7, Q4 and Q10 to be always OFF, a voltage conversion ratio of the resonant switching power converter 60 can be adjusted to be 2:1.

Figure 5A:
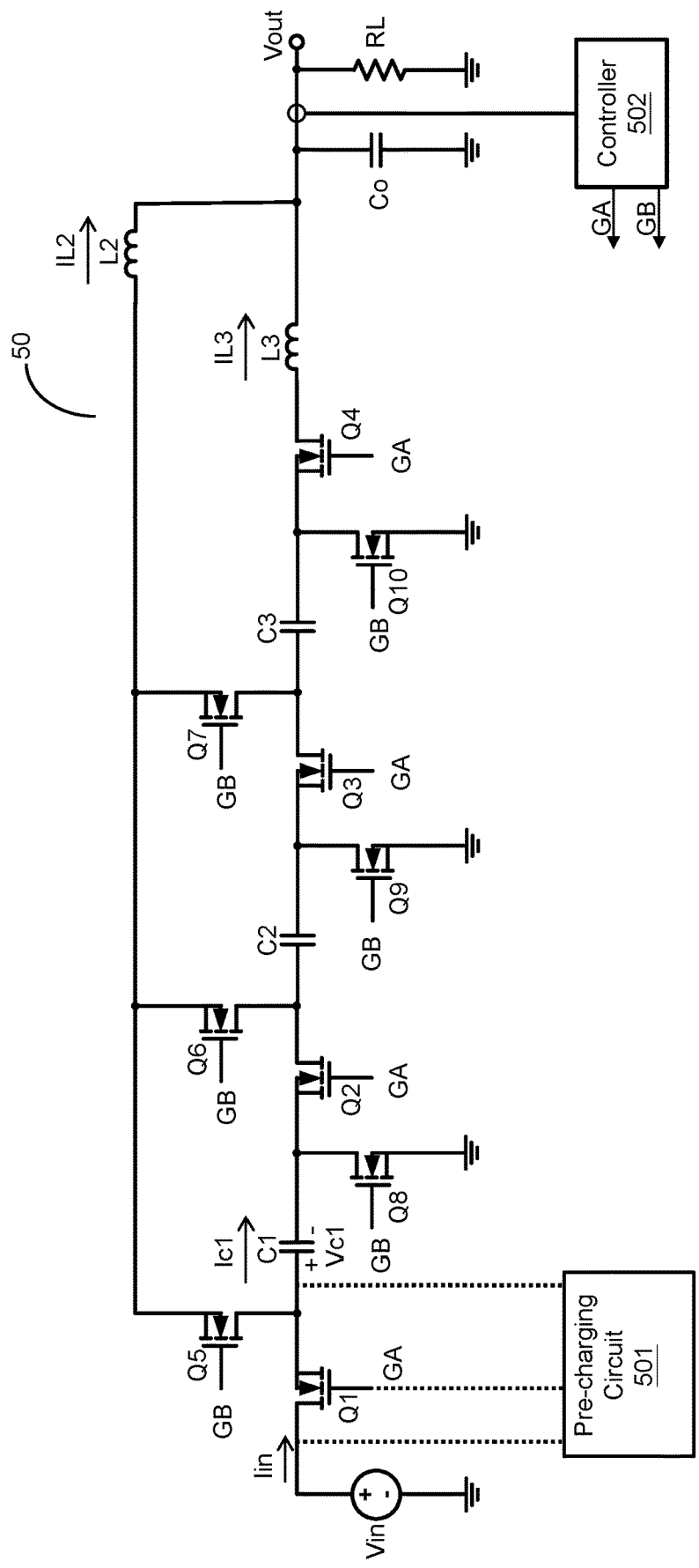
FIG. 5A shows a schematic circuit diagram of a resonant switching power converter according to another embodiment of the present invention.

Please refer to FIG. 5A, which shows a schematic circuit diagram of a resonant switching power converter according to another embodiment of the present invention. This embodiment shown in FIG. 5A is similar to the embodiment shown in FIG. 2, but is different in that: this embodiment adopts a charging inductor L3 and a discharging inductor L2. In this embodiment, plural capacitors share one same single charging inductor L3 or one same single discharging inductor L2. Thus, regardless how many capacitors there may be, this embodiment can reduce the required inductor number. As shown in FIG. 5A, a resonant switching power converter 50 of the present invention comprises: capacitors C1, C2 and C3, switches Q1-Q10, a charging inductor L3, a discharging inductor L2, a pre-charging circuit 501 and a controller 502. The switches Q1-Q3 are connected in series to the capacitors C1, C2 and C3, respectively, whereas, the switch Q4 is connected in series to the charging inductor L3. Certainly, it should be understood that the implementation of the number of the capacitors of the resonant switching power converter 50 as three in the above-mentioned preferred embodiment is only an illustrative example, but not for limiting the broadest scope of the present invention. In other embodiments, it is also practicable and within the scope of the present invention that the number of the capacitors of the resonant switching power converter 50 can be any multiple number other than three. In one embodiment, an inductance of the charging inductor L3 is equal to an inductance of the discharging inductor L2.

As shown in FIG. 5A, in one embodiment, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the capacitor C1. One end of the switch Q9 is coupled to a node between the switch Q3 and the capacitor C2. One end of the switch Q10 is coupled to a node between the switch Q4 and the capacitor C3. As shown in FIG. 5A, the other ends of the switches Q5-Q7 are commonly electrically connected to a node which is coupled to the discharging inductor L2. The other ends of the switches Q8-Q10 are commonly coupled to the ground voltage level. The other ends of the charging inductor L3 and the discharging inductor L2 are commonly coupled to the output voltage Vout. The other end of the switch Q1 is coupled to input voltage Vin.

When the resonant switching power converter 50 operates in the pre-charging mode, the pre-charging circuit 501 is configured to operably control the switch Q1, so as to control an electrical connection relationship between the input voltage Vin and the capacitor C1, and is configured to operably control other switches Q2-Q10, so as to control the capacitors C1-C3 to be connected in parallel to one another or to be connected in series to one another, so that when the voltage drop across the capacitor C1 is lower than the predetermined voltage, the voltage drop across each capacitor C1-C3 is charged to the predetermined voltage. The above-mentioned predetermined voltage for example can be a target voltage of the output voltage Vout, such as ¼ of the input voltage Vin. In one embodiment, to achieve the above-mentioned configuration of connecting the capacitors C1-C3 in series to one another, the switches Q2-Q4 can be ON while the switches Q5-Q10 can be be OFF; to achieve the above-mentioned configuration of connecting the capacitors C1-C3 in parallel to one another, the switches Q5-Q10 can be ON, while the switches Q2-Q4 can be OFF. After the pre-charging mode ends, the resonant switching power converter 50 will subsequently operate in the resonant voltage conversion mode, to thereby convert the input voltage Vin to the output voltage Vout. The pre-charging circuit 501 of this embodiment can be implemented as the configuration of the pre-charging circuit 201 shown in FIG. 3 or the configuration of the pre-charging circuit 201 shown in FIG. 4. The controller 502 is configured to operably generate a charging operation signal GA corresponding to a charging process in the resonant voltage conversion mode and is configured to operably generate a discharging operation signal GB corresponding to a discharging process in the resonant voltage conversion mode, so as to operate the switches Q1-Q10 in the resonant voltage conversion mode, so that the switches Q1-Q10 switch electrical connection relationships of the capacitors C1-C3.

After the pre-charging mode ends, the resonant switching power converter 50 will subsequently operate in the resonant voltage conversion mode. In the resonant voltage conversion mode, the switches Q1-Q10 are controlled to switch electrical connection relationships between the capacitors C1-C3 and one of more of (1)-(2): (1) the charging inductor L3, and (2) the discharging inductor L2, according to the charging operation signal GA and the discharging operation signal GB generated by the controller 502. In the charging process of the resonant voltage conversion mode, according to the charging operation signal GA, the switches Q1-Q4 are controlled to be ON, whereas, the switches Q5-Q10 are controlled to be OFF, so that a series connection of the capacitors C1-C3 and the charging inductor L3 is formed between the input voltage Vin and the output voltage Vout, which forms a charging path. In the discharging process of the resonant voltage conversion mode, according to discharging operation signals GB, the switches Q5-Q10 are controlled to be ON, whereas, the switches Q1-Q4 are controlled to be OFF, so that so that the capacitors C1-C3 form a parallel circuit and the parallel circuit of the capacitors C1-C3 is connected in series to the inductor L2, to form plural discharging paths. It is noteworthy that, in one embodiment, the above-mentioned charging process of the resonant voltage conversion mode and the above-mentioned discharging process of the resonant voltage conversion mode are arranged at different periods in a repeated, alternating manner, to convert the input voltage Vin to an output voltage Vout. That is, the above-mentioned charging process of the resonant voltage conversion mode and the above-mentioned discharging process of the resonant voltage conversion mode are not performed at the same time. In this embodiment, the DC bias voltages of the capacitors C1, C2 and C3 all have a level of Vo. As a consequence, when the same level of the input voltage and the same level of the output voltage are provided, the capacitors C1, C2 and C3 of this embodiment, as compared to the prior art, will only need to withstand a relatively lower rated voltage. Hence, this embodiment can utilize capacitors having a smaller size.

In one embodiment, the charging resonant frequency of the above-mentioned charging process of a resonant voltage conversion mode is the same as the discharging resonant frequency of the above-mentioned discharging process of a resonant voltage conversion mode. In one embodiment, the charging resonant frequency of the above-mentioned charging process of a resonant voltage conversion mode is different from the discharging resonant frequency of the above-mentioned discharging process of a resonant voltage conversion mode. In one embodiment, the above-mentioned resonant switching power converter 50 can be a bidirectional resonant switching power converter. In one embodiment, a voltage conversion ratio of the input voltage Vin to the output voltage Vout of the above-mentioned resonant switching power converter 50 is adjustable to be 4:1, 3:1 or 2:1.

In one embodiment, the duration period (Ton1) of the above-mentioned charging process of a resonant voltage conversion mode is correlated with the charging resonant frequency (fr1) of the above-mentioned charging process. In one embodiment, the duration period (Ton1) of the above-mentioned charging process of a resonant voltage conversion mode is correlated with a positive half wave of a charging resonant current of the charging process. For example, turned-ON time points and turned-OFF time points of the switches Q1-Q4 are substantially synchronous with a starting time point and an ending time point of the positive half wave of the charging resonant current of the charging process. In one embodiment, the duration period (Ton2) of the above-mentioned discharging process of a resonant voltage conversion mode is correlated with the discharging resonant frequency (fr2) of the above-mentioned discharging process. In one embodiment, the duration period (Ton2) of the above-mentioned discharging process of a resonant voltage conversion mode is correlated with a positive half wave of a discharging resonant current of the discharging process. For example, turned-ON time points and turned-OFF time points of the switches Q5-Q10 are substantially synchronous with a starting time point and an ending time point of the positive half wave of the discharging resonant current of the discharging process.

In one embodiment, because the charging operation signal GA switches its level when a current flowing through the charging inductor L3 or the discharging inductor L2 is approximately zero, the switches Q1-Q4 can be switched at a time point at which the currents flowing through the switches Q1-Q4 are at a relatively lower level of their respective positive half waves, so that soft switching can be achieved. In one embodiment, zero current switching (ZCS) can be achieved.

Besides, note that although it is preferred for the duration period of the charging process to be equal to the duration period of the discharging process (i.e., the duration period of the charging process is equal to 50% of the cycle period (i.e., duty ratio=50%)), to achieve exact zero current switching, however due to non-idealities caused by for example imperfection of components or imperfect matching among components, the duration period of the charging process may not be equal to exactly 50% of the cycle period, but just close to 50% of the cycle period. In other words, according to the present invention, a certain level of error between the duration period of the charging process and 50% of the cycle period (i.e., duty ratio=50%) is acceptable, and therefore the term "substantially" is used to mean that an insignificant error within a tolerable range is acceptable. The term "substantially" used in other occurrences in this specification also means that an insignificant error within a tolerable range is acceptable.

In one embodiment, the duration period of the above-mentioned charging process of a resonant voltage conversion mode is smaller than a specific ratio of cycle period by a predetermined period. For example, the duration period of the above-mentioned charging process is smaller than 50% of the cycle period (i.e., duty ratio=50%) by a predetermined period. Thus, after the switches Q1-Q4 have been turned OFF, a little amount of current remains, which flows through the charging inductor L3 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted, to achieve zero voltage switching (ZVS). On the other hand, in one embodiment, the duration period of the above-mentioned discharging process of a resonant voltage conversion mode is greater than a specific ratio of cycle period by a predetermined period. For example, the duration period of the above-mentioned discharging process is greater than 50% of the cycle period (i.e., duty ratio=50%) by a predetermined period. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted, to achieve zero voltage switching (ZVS). In one embodiment according to the present invention, the entire circuit of the resonant switching power converter 50 shown in the figure (except the input voltage Vin) can support hot-swapping operation.

The pre-charging mode is for pre-charging the capacitors C1-C3 to the predetermined voltage before the resonant switching power converter 50 operates in the resonant voltage conversion mode, in order to avoid unwanted inrush current. The charging operation signal GA and the discharging operation signal GB shown in FIG. 5A are for use in the resonant voltage conversion mode. In the pre-charging mode, the switches operate as described previously and do not operate according to the charging operation signal GA and the discharging operation signal GB.

Figure 5B:
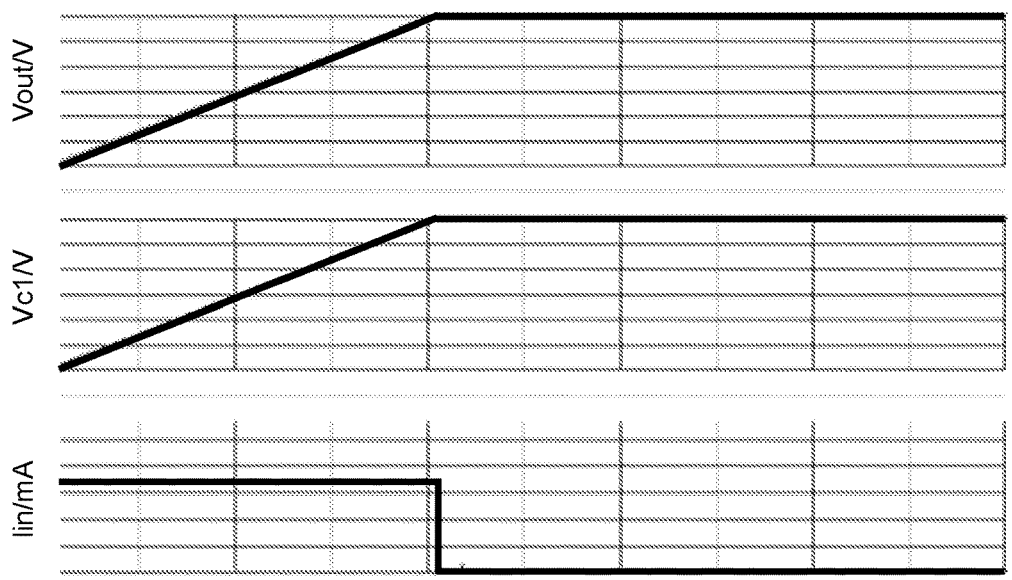
FIG. 5B illustrates waveforms of relevant signals related to the operation of a resonant switching power converter shown in FIG. 5A, wherein the resonant switching power converter shown in FIG. 5A operates in a pre-charging mode.

Please refer to FIG. 5B, which illustrates waveforms of relevant signals related to the operation of a resonant switching power shown in FIG. 5A, wherein the resonant switching power converter shown in FIG. 5A operates in the pre-charging mode. An output voltage Vout, a voltage Vc1 across a capacitor C1 and an input current Iin are shown FIG. 5B. As shown in FIG. 5B, in one embodiment, in the pre-charging mode, both the output voltage Vout and the voltage Vc1 across the capacitor C1 stably rise up in an linear manner.

Figure 5C:
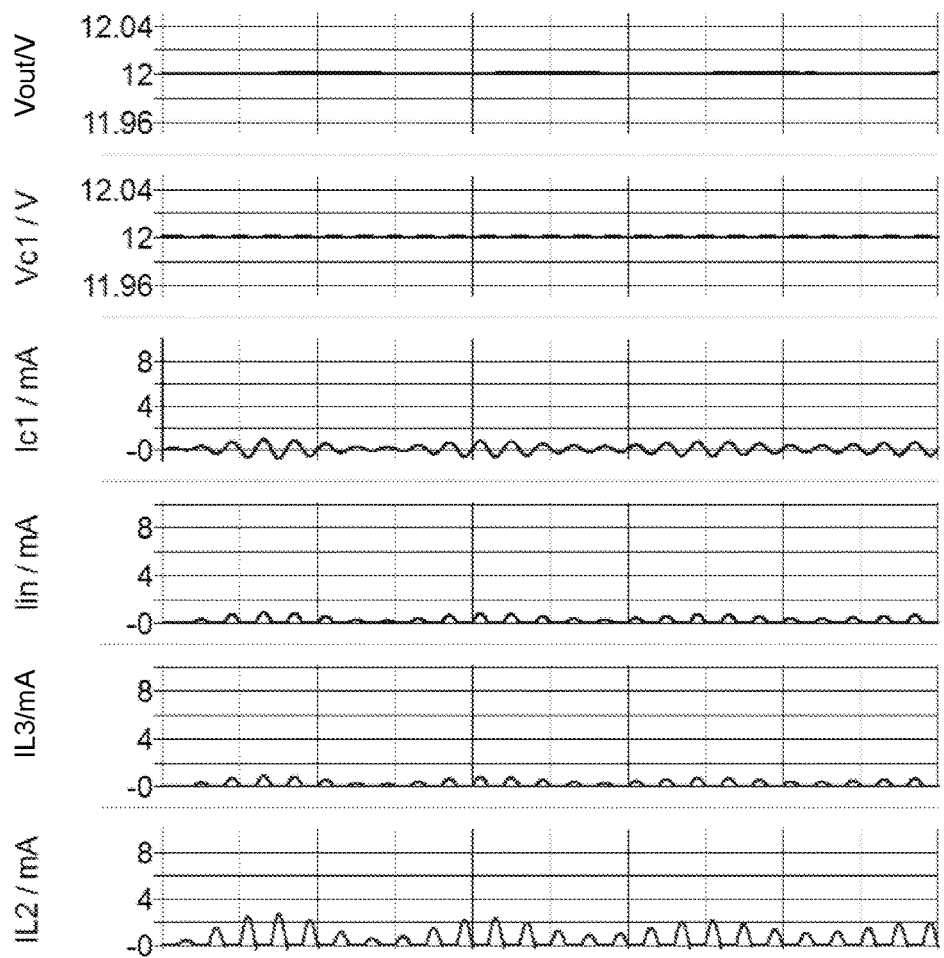
FIG. 5C illustrates waveforms of relevant signals related to the operation of a resonant switching power converter shown in FIG. 5A, wherein the resonant switching power converter shown in FIG. 5A operates in a resonant voltage conversion mode.
Figure 5D:
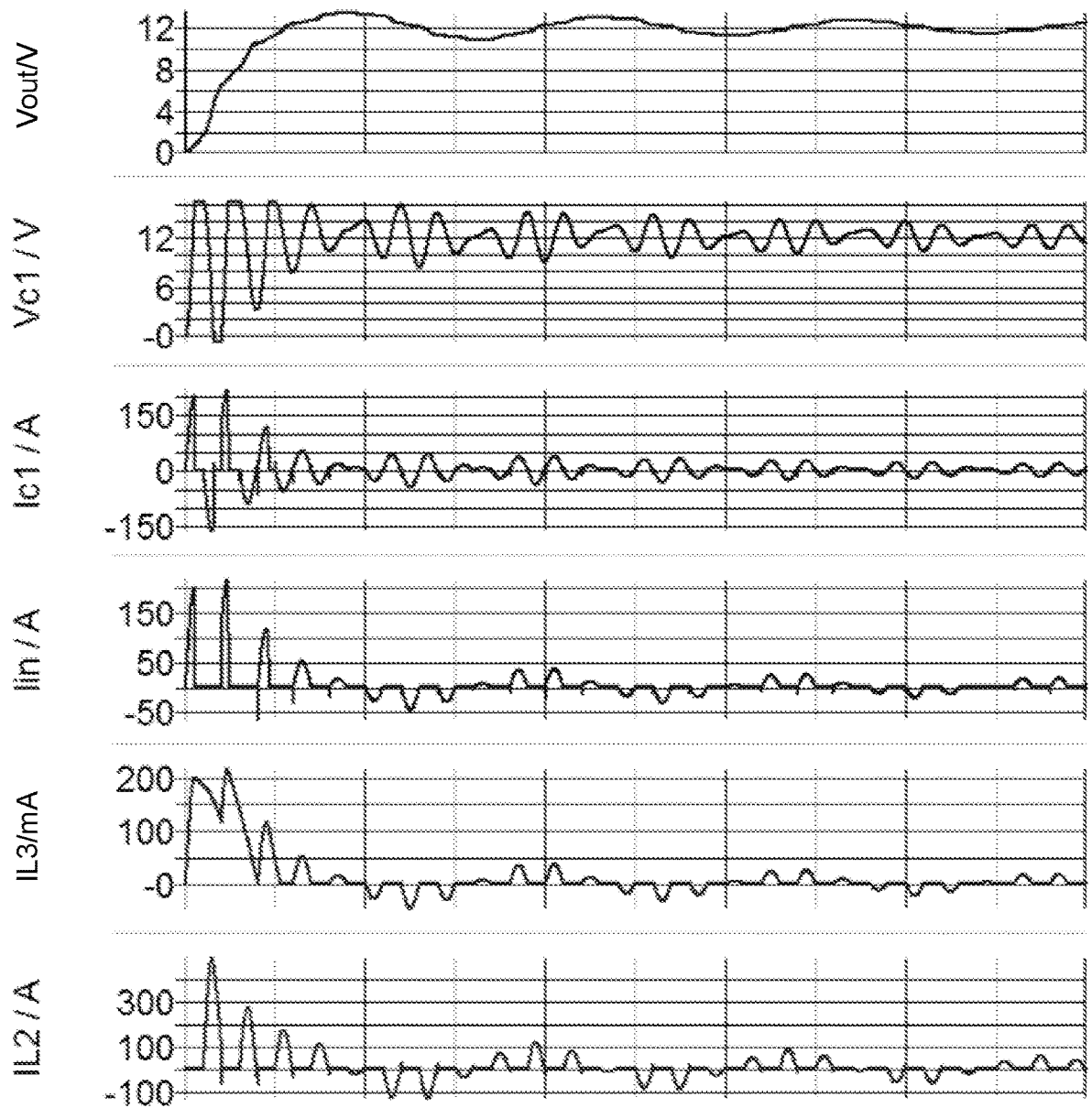
FIG. 5D illustrates waveforms of relevant signals related to the operation of a resonant switching power converter, wherein the resonant switching power converter shown in FIG. 5D does not include any pre-charging circuit.

Please refer to FIG. 5C and FIG. 5D. FIG. 5C illustrates waveforms of relevant signals related to the operation of a resonant switching power converter shown in FIG. 5A, wherein the resonant switching power converter shown in FIG. 5A operates in the resonant voltage conversion mode. FIG. 5D illustrates waveforms of relevant signals related to the operation of a resonant switching power converter which does not include a pre-charging circuit. An output voltage Vout, a voltage Vc1 across a capacitor C1, an input current Iin, a charging inductor current IL3 and a discharging inductor current IL2 are shown in FIG. 5C and FIG. 5D. As shown FIG. 5C and FIG. 5D, when the resonant switching power converter does not include a pre-charging circuit (i.e., resonant switching power converter as shown FIG. 5D), an unwanted inrush current will occur when the resonant switching power converter enters to a resonant voltage conversion mode. In contrast, in the resonant switching power converter shown in FIG. 5A, which includes a pre-charging circuit (i.e., as shown by the waveforms of FIG. 5C), the unwanted inrush current does not occur.

Figure 6:
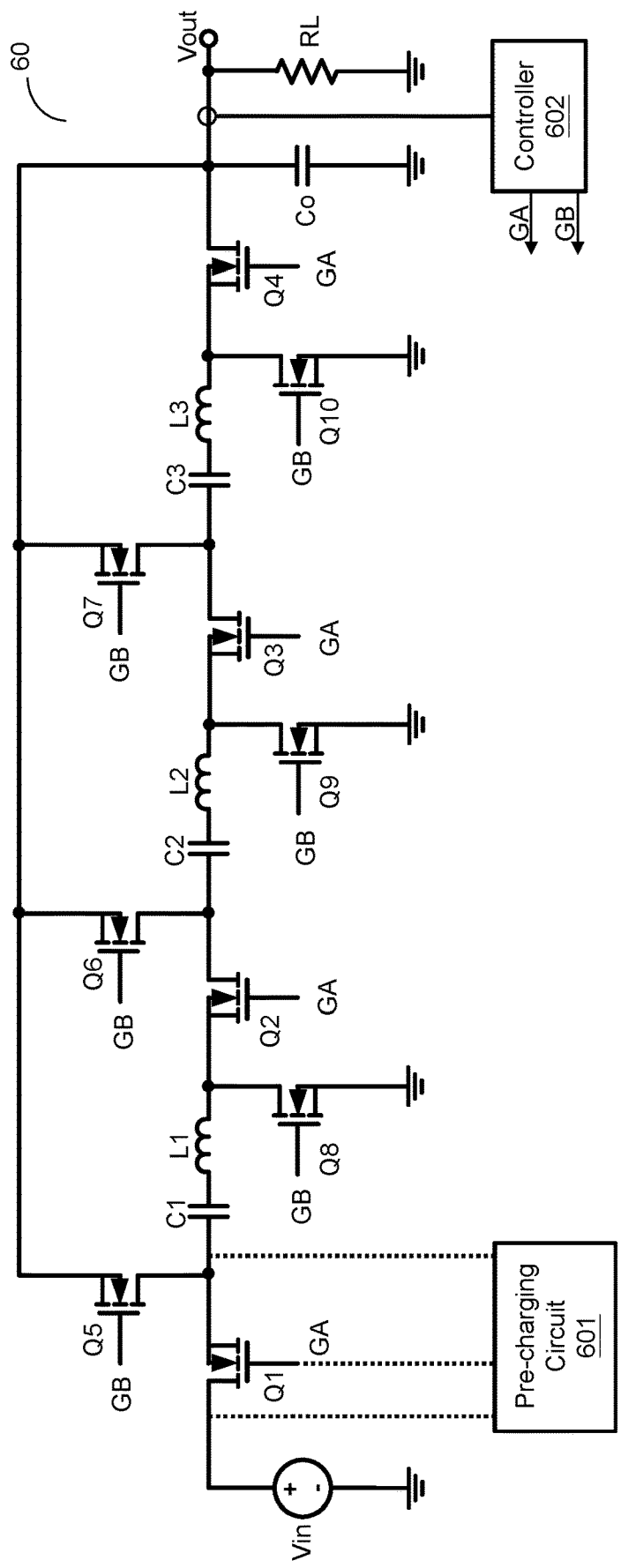
FIG. 6 shows a schematic circuit diagram of a resonant switching power converter according to yet another embodiment of the present invention.

Please refer to FIG. 6, which shows a schematic circuit diagram of a resonant switching power converter according to yet another embodiment of the present invention. As shown in FIG. 6, in one embodiment, the resonant switching power converter 60 of the present invention comprises: capacitors C1, C2 and C3, switches Q1, Q2, Q3, Q4, Q5, Q6, Q7, Q8, Q9 and Q10, inductors L1, L2, and L3, a pre-charging circuit 601 and a controller 602. The switches Q1, Q2 and Q3 are connected in series to the capacitors C1, C2 and C3, respectively. The capacitors C1, C2 and C3 are connected in series to the inductors L1, L2, and L3, respectively. However, it should be understood that the implementation of the number of the capacitor of the resonant switching power converter 60 as three in this embodiment is only an illustrative example, but not for limiting the broadest scope of the present invention. In other embodiments, it is also practicable and within the scope of the present invention that the number of the capacitors of the resonant switching power converter 60 can be any plural number other than three. Besides, it should be understood that the implementation of the number of the inductor of the resonant switching power converter 60 as three in this embodiment is only an illustrative example, but not for limiting the broadest scope of the present invention. In other embodiments, it is also practicable and within the scope of the present invention that the number of the inductors of the resonant switching power converter 60 can be a singular number, or any plural number other than three, if a plural number is desired. It should be understood that the number of a device in this embodiment is only given as an illustrative example.

As shown in FIG. 6, in one embodiment, one end of the switch Q5 is coupled to a node between the switch Q1 and the capacitor C1. One end of the switch Q6 is coupled to a node between the switch Q2 and the capacitor C2. One end of the switch Q7 is coupled to a node between the switch Q3 and the capacitor C3. One end of the switch Q8 is coupled to a node between the switch Q2 and the inductor L1. One end of the switch Q9 is coupled to a node between the switch Q3 and the inductor L2. One end of the switch Q10 is coupled to a node between the switch Q4 and the inductor L3. As shown in FIG. 6, the other ends of the switches Q5-Q7 are commonly electrically connected to an output voltage Vout. The other ends of the switches Q8-Q10 are commonly coupled to a ground voltage level. The switch Q4 is connected in series to a node between the output voltage Vout and the inductor L3. The other end of the switch Q1 is coupled to an input voltage Vin.

When the resonant switching power converter 60 operates in the pre-charging mode, the pre-charging circuit 601 is configured to operably control the switch Q1, so as to control an electrical connection relationship between the input voltage Vin and the capacitor C1, and is configured to operably control other switches Q2-Q10, so as to control the capacitors C1-C3 to be connected in parallel to one another or to be connected in series to one another, so that when the voltage drop across the capacitor C1 is lower than the predetermined voltage, the voltage drop across each capacitor C1-C3 is charged to the predetermined voltage. The above-mentioned predetermined voltage for example can be a target voltage of the output voltage Vout, such as ¼ of the input voltage Vin. In one embodiment, to achieve the above-mentioned configuration of connecting the capacitors C1-C3 in series to one another, the switches Q2-Q4 can be ON while the switches Q5-Q10 can be be OFF; to achieve the above-mentioned configuration of connecting the capacitors C1-C3 in parallel to one another, the switches Q5-Q10 can be ON, while the switches Q2-Q4 can be OFF. After the pre-charging mode ends, the resonant switching power converter 60 will subsequently operate in the resonant voltage conversion mode, to thereby convert the input voltage Vin to the output voltage Vout. The pre-charging circuit 601 of this embodiment can be implemented as the configuration of the pre-charging circuit 201 shown in FIG. 3 or the configuration of the pre-charging circuit 201 shown in FIG. 4. The controller 602 is configured to operably generate a charging operation signal GA corresponding to a charging process in the resonant voltage conversion mode and is configured to operably generate a discharging operation signal GB corresponding to a discharging process in the resonant voltage conversion mode, so as to operate the switches Q1-Q10 in the resonant voltage conversion mode, so that the switches Q1-Q10 switch electrical connection relationships of the capacitors C1-C3.

After pre-charging mode ends, the resonant switching power converter 60 will subsequently operate in the resonant voltage conversion mode. In the resonant voltage conversion mode, the switches Q1-Q10 are controlled to switch electrical connection relationships between the capacitors C1-C3 and the inductors L1-L3 according to the charging operation signal GA and the discharging operation signal GB generated by the controller 602. In a charging process of the resonant voltage conversion mode, according to the charging operation signal GA, the switches Q1-Q4 are controlled to be ON, whereas, the switches Q5-Q10 are controlled to be OFF, so that a series connection of the capacitors C1-C3 and the inductors L1-L3 is formed between the input voltage Vin and the output voltage Vout, which forms a charging path. In a discharging process of the resonant voltage conversion mode, according to discharging operation signals GB, the switches Q5-Q10 are controlled to be ON, whereas, the switches Q1-Q4 are controlled to be OFF, so that a series connection of the capacitor C1 and the inductor L1 is formed between the output voltage Vout and the ground voltage level; a series connection of the capacitor C2 and the inductor L2 is formed between the output voltage Vout and the ground voltage level; a series connection of the capacitor C3 and the inductor L3 is formed between the output voltage Vout and the ground voltage level, to form plural discharging paths. It is noteworthy that, in one embodiment, the above-mentioned charging process of the resonant voltage conversion mode and the above-mentioned discharging process of the resonant voltage conversion mode are arranged at different periods in a repeated, alternating manner, to convert the input voltage Vin to an output voltage Vout. That is, the above-mentioned charging process of the resonant voltage conversion mode and the above-mentioned discharging process of the resonant voltage conversion mode are not performed at the same time. In this embodiment, the DC bias voltages of the capacitors C1, C2 and C3 all have a level of Vo. As a consequence, the capacitors C1, C2 and C3 of this embodiment will only need to withstand a relatively lower rated voltage. Hence, this embodiment can utilize capacitors having a smaller size.

In one embodiment, because the charging operation signal GA switches its level when currents flowing through the inductor L1, the inductor L2 and the inductor L3 are approximately zero, the switches Q1-Q4 can be switched at a time point at which the currents flowing through the switches Q1-Q4 are at a relatively lower level of their respective positive half waves, so that soft switching can be achieved. In one embodiment, zero current switching (ZCS) can be achieved.

In one embodiment, the charging process of the resonant voltage conversion mode has a charging resonant frequency, whereas, the discharging process of the resonant voltage conversion mode has a discharging resonant frequency, and wherein the charging resonant frequency is the same as the discharging resonant frequency. In one embodiment according to the present invention, the entire circuit of the resonant switching power converter 60 shown in the figure (except the input voltage Vin) can support hot-swapping operation.

The pre-charging mode is for pre-charging the capacitors C1-C3 to the predetermined voltage before the resonant switching power converter 60 operates in the resonant voltage conversion mode, in order to avoid unwanted inrush current. The charging operation signal GA and the discharging operation signal GB shown in FIG. 6 are for use in the resonant voltage conversion mode. In the pre-charging mode, the switches operate as described previously and do not operate according to the charging operation signal GA and the discharging operation signal GB.

Figure 7:
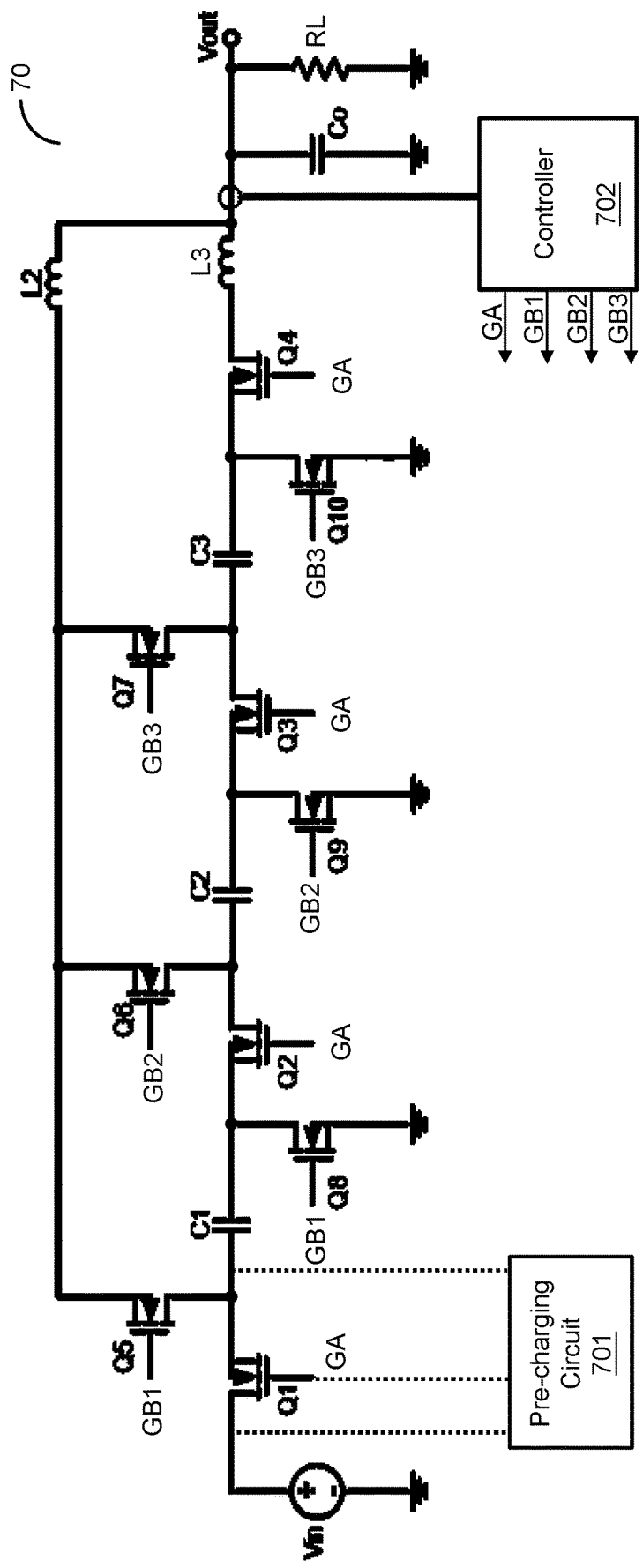
FIG. 7 shows a schematic circuit diagram of a resonant switching power converter according to still another embodiment of the present invention.

Please refer to FIG. 7, which shows a schematic circuit diagram of a resonant switching power converter according to still another embodiment of the present invention. The configurations of the capacitors C1-C3, the charging inductor L3, the discharging inductor L2 and the switches Q1-Q10 shown in FIG. 7 are implemented in a similar manner as the configurations of the capacitors C1-C3, the charging inductor L3, the discharging inductor L2 and the switches Q1-Q10 shown in FIG. 5A, so the details thereof are not redundantly repeated here. This embodiment shown in FIG. 7 is different from the embodiment shown in FIG. 5A in that: this embodiment executes plural discharging processes in a sequential order. Besides, the controller 702 of this embodiment is configured to operably generate a charging operation signal GA corresponding to a charging process in the resonant voltage conversion mode and plural discharging operation signals GB1, GB2 and GB3 corresponding to plural discharging processes in the resonant voltage conversion mode, so as to operate the switches Q1-Q10 in the resonant voltage conversion mode, so that the switches Q1-Q10 switch electrical connection relationships of the capacitors C1-C3.

When the resonant switching power converter 70 operates in the pre-charging mode, the pre-charging circuit 701 is configured to operably control the switch Q1, so as to control an electrical connection relationship between the input voltage Vin and the capacitor C1, and is configured to operably control other switches Q2-Q10, so as to control the capacitors C1-C3 to be connected in parallel to one another or to be connected in series to one another, so that when the voltage drop across the capacitor C1 is lower than the predetermined voltage, the voltage drop across each capacitor C1-C3 is charged to the predetermined voltage. The above-mentioned predetermined voltage for example can be a target voltage of the output voltage Vout, such as ¼ of the input voltage Vin. In one embodiment, to achieve the above-mentioned configuration of connecting the capacitors C1-C3 in series to one another, the switches Q2-Q4 can be ON while the switches Q5-Q10 can be be OFF; to achieve the above-mentioned configuration of connecting the capacitors C1-C3 in parallel to one another, the switches Q5-Q10 can be ON, while the switches Q2-Q4 can be OFF. After the pre-charging mode ends, the resonant switching power converter 70 will subsequently operate in the resonant voltage conversion mode, to thereby convert the input voltage Vin to the output voltage Vout. The pre-charging circuit 701 of this embodiment can be implemented as the configuration of the pre-charging circuit 201 shown in FIG. 3 or the configuration of the pre-charging circuit 201 shown in FIG. 4.

After the pre-charging mode ends, the resonant switching power converter 70 will subsequently operate in the resonant voltage conversion mode. In the resonant voltage conversion mode, the switches Q1-Q10 are controlled to switch electrical connection relationships between the capacitors C1-C3 and one of more of (1)-(2): (1) the charging inductor L3, and (2) the discharging inductor L2 according to the charging operation signal GA and the discharging operation signals GB1, GB2 and GB3 generated by the controller 702. In one embodiment, the charging operation signal GA and the discharging operation signals GB1, GB2 and GB3 have respective ON periods which do not overlap one another.

For example, in a charging process of the resonant voltage conversion mode, according to the charging operation signal GA, the switches Q1-Q4 are turned ON, whereas, the switches Q5-Q10 are turned OFF, so that a series connection of the capacitors C1-C3 and the charging inductor L3 is formed between the input voltage Vin and the output voltage Vout, to form a charging path. In plural discharging processes of the resonant voltage conversion mode, according to discharging operation signals GB1, GB2 and GB3, respectively, the switches Q5-Q10 are turned ON in turn, whereas, the switches Q1-Q4 are turned OFF, so that the capacitors C1, C2 and C3 are individually connected in series to the discharging inductor L2 in a sequential order, to form plural discharging paths. That is, the discharging paths are formed in sequential order in the plural discharging processes. For example, during a first discharging process of the resonant voltage conversion mode, according to the discharging operation signal GB1, the switches Q5 and Q8 are turned ON, whereas, the switches Q1-Q4, Q6-Q7 and Q9-Q10 are turned OFF, so that a series connection of the capacitor C1 and the discharging inductor L2 is formed between the output voltage Vout and the ground voltage level, to form a first discharging path. During a second discharging process of the resonant voltage conversion mode, according to the discharging operation signal GB2, the switches Q6 and Q9 are turned ON, whereas, the switches Q1-Q5, Q7, Q8 and Q10 are turned OFF, so that a series connection of the capacitor C2 and the discharging inductor L2 is formed between the output voltage Vout and the ground voltage level, to form a second discharging path. During a third discharging process of the resonant voltage conversion mode, according to the discharging operation signal GB3, the switches Q7 and Q10 are turned ON, whereas, the switches Q1-Q6 and Q8-Q9 are turned OFF, so that a series connection of the capacitor C3 and the discharging inductor L2 is formed between the output voltage Vout and the ground voltage level, to form a third discharging path.

It is noteworthy that, in one embodiment, the above-mentioned charging process of the resonant voltage conversion mode and the above-mentioned first discharging process, second discharging process and third discharging process of the resonant voltage conversion mode are arranged at different periods in a repeated, alternating manner, to convert the input voltage Vin to the output voltage Vout; the above-mentioned charging process of the resonant voltage conversion mode and the above-mentioned first discharging process, second discharging process and third discharging process of the resonant voltage conversion mode are not performed at the same time. That is, after a charging process of the resonant voltage conversion mode is performed and ends, a first discharging process of the resonant voltage conversion mode follows; a second discharging process of the resonant voltage conversion mode follows next, and a third discharging process of the resonant voltage conversion mode follows further next, in sequential order. After the third discharging process of the resonant voltage conversion mode is performed and ends, another charging process of the resonant voltage conversion mode is performed, and so on.

In this embodiment, the DC bias voltages of the capacitors C1, C2 and C3 all have a level of Vo. As a consequence, when the same level of the input voltage and the same level of the output voltage are provided, the capacitors C1, C2 and C3 of this embodiment, as compared to the prior art, will only need to withstand a relatively lower rated voltage. Hence, this embodiment can utilize capacitors having a smaller size.

In one embodiment, the charging resonant frequency of the above-mentioned charging process of the resonant voltage conversion mode is the same as the discharging resonant frequency of the above-mentioned plural discharging processes of the resonant voltage conversion mode. In one embodiment, the charging resonant frequency of the above-mentioned charging process of the resonant voltage conversion mode is different from the discharging resonant frequency of the above-mentioned plural discharging processes of the resonant voltage conversion mode. In one embodiment, the above-mentioned resonant switching power converter 70 can be a bidirectional resonant switching power converter. In one embodiment, a voltage conversion ratio of the input voltage Vin to the output voltage Vout of the above-mentioned resonant switching power converter 70 is adjustable to be 4:1, 3:1 or 2:1.

In one embodiment, because the charging operation signal GA switches its level when a current flowing through the charging inductor L3 or the discharging inductor L2 is approximately zero, the switches Q1-Q4 can be switched at a time point at which the currents flowing through the switches Q1-Q4 are at a relatively lower level of their respective positive half waves, so that soft switching can be achieved. In one embodiment, zero current switching (ZCS) can be achieved.

In one embodiment, the duration period of the above-mentioned charging process of the resonant voltage conversion mode is smaller than a specific ratio of cycle period by a predetermined period. For example, the duration period of the above-mentioned charging process is smaller than 25% of the cycle period (i.e., duty ratio=25%) by a predetermined period. Thus, after the switches Q1-Q4 have been turned OFF, a little amount of current remains, which flows through the charging inductor L3 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period can be adjusted, to achieve zero voltage switching (ZVS). On the other hand, in one embodiment, the duration period of the above-mentioned discharging process of the resonant voltage conversion mode is greater than a specific ratio of cycle period by a predetermined period. For example, the duration period of the last one of the above-mentioned plural discharging processes is greater than 25% of the cycle period (i.e., duty ratio=25%) by a predetermined period. Thus, during the delayed turned-OFF period of the switches Q7 and Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, the predetermined period can be adjusted, to achieve zero voltage switching (ZVS). In one embodiment according to the present invention, the entire circuit of the resonant switching power converter 70 shown in the figure (except the input voltage Vin) can support hot-swapping operation.

The pre-charging mode is for pre-charging the capacitors C1-C3 to the predetermined voltage before the resonant switching power converter 70 operates in the resonant voltage conversion mode, in order to avoid unwanted inrush current. The charging operation signal GA and the discharging operation signals GB1, GB2 and GB3 shown in FIG. 7 are for use in the resonant voltage conversion mode. In the pre-charging mode, the switches operate as described previously and do not operate according to the charging operation signal GA and the discharging operation signals GB1, GB2 and GB3.

Figure 8A:
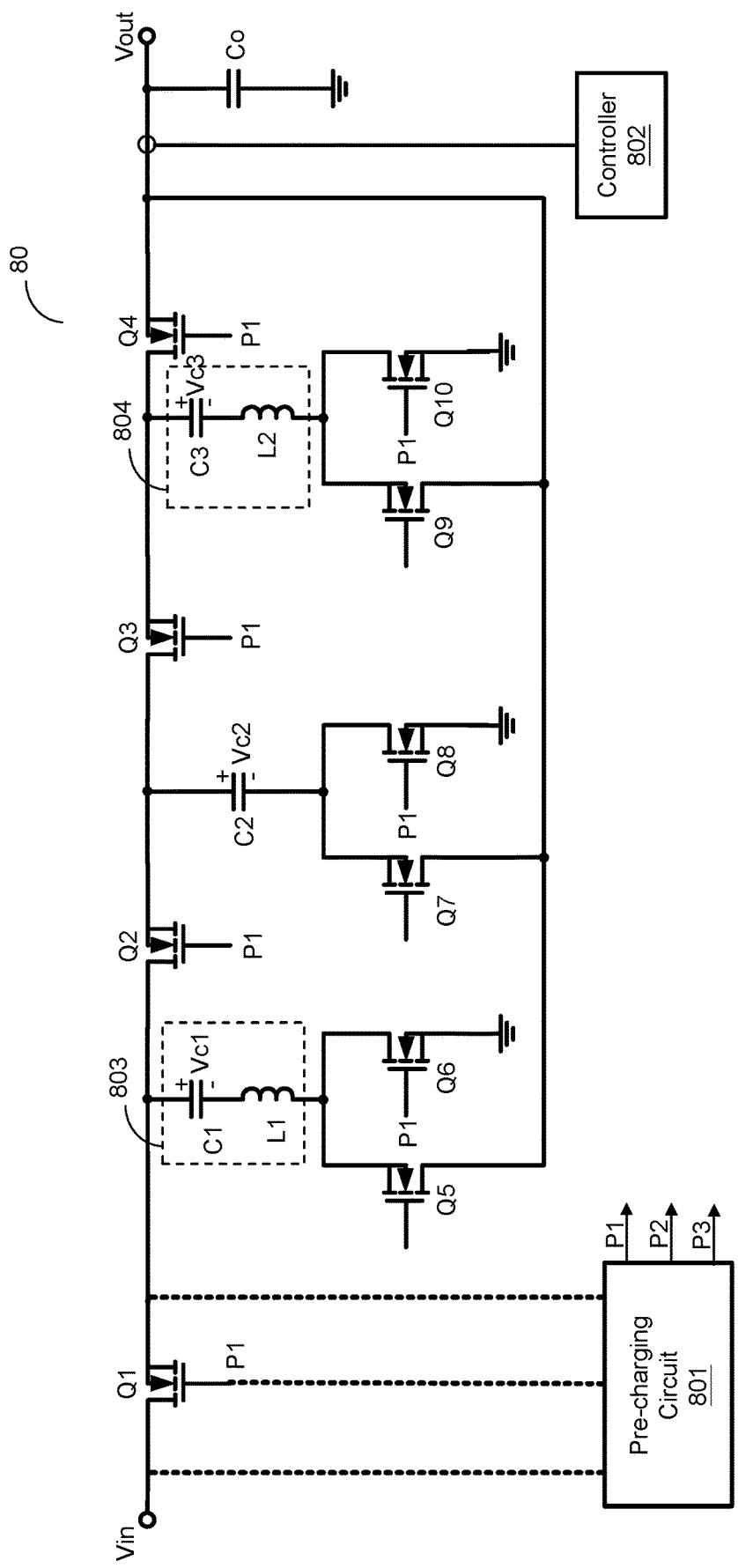
FIGS. 8A-8D show schematic circuit diagrams of a resonant switching power converter according to still another embodiment of the present invention.

Please refer to FIGS. 8A-8D, which show a schematic circuit diagram of a resonant switching power converter according to still another embodiment of the present invention. As shown in FIG. 8A, in one embodiment, a resonant switching power converter 80 of the present invention comprises: resonant capacitors C1 and C3, at least one non-resonant capacitor C2, switches Q1-Q10, resonant inductors L1 and L2, a pre-charging circuit 801 and a controller 802.

Figure 8B:
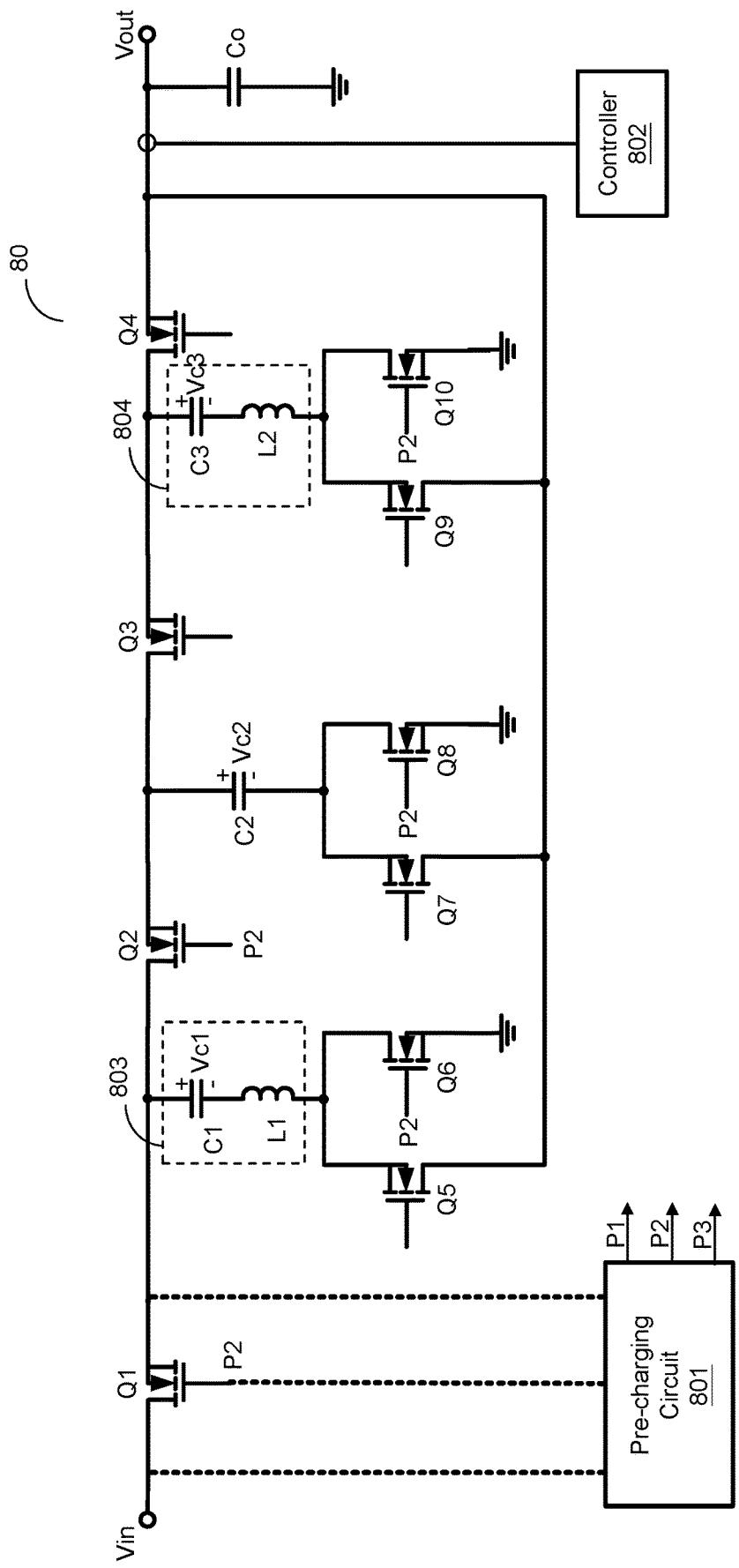
Figure 8C:
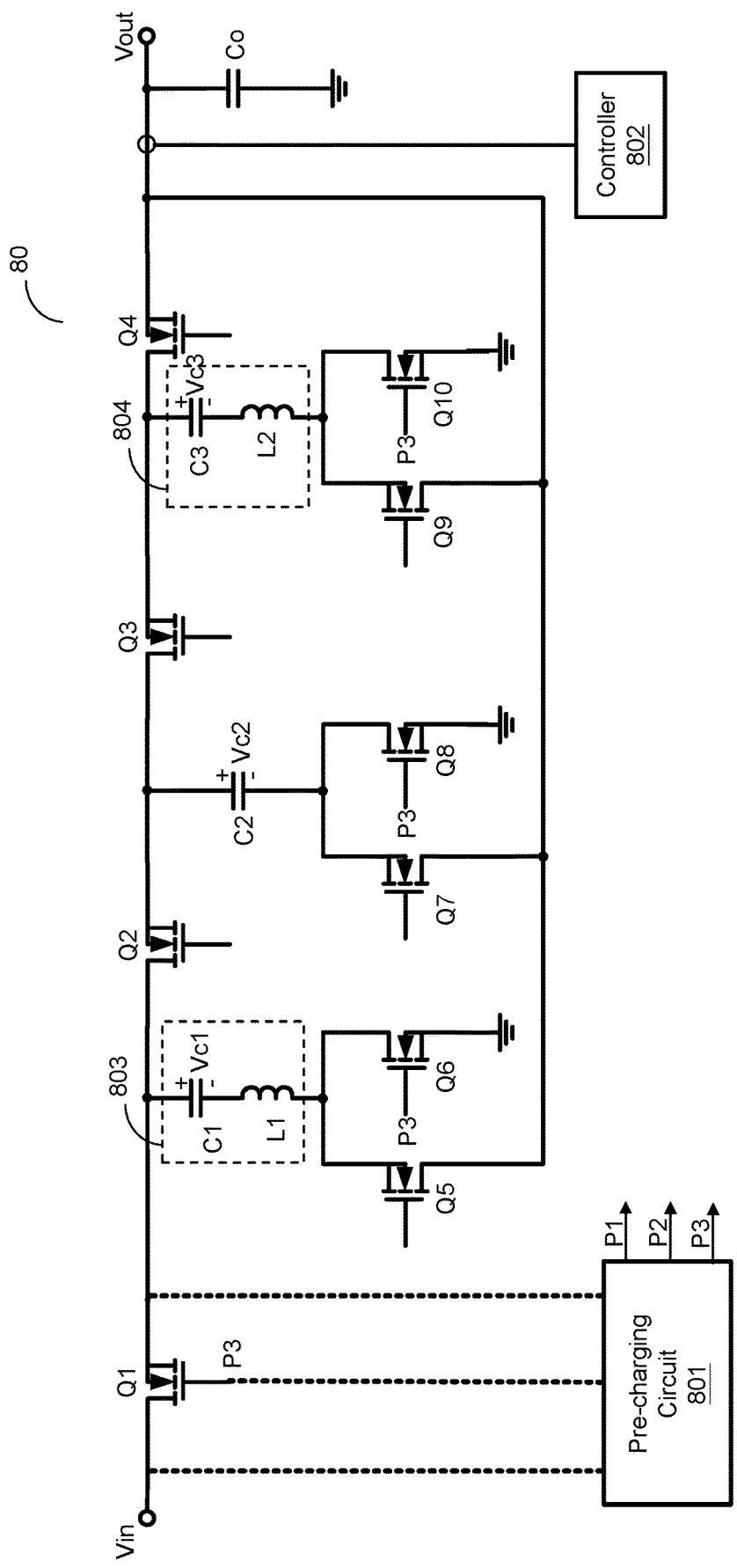

When the resonant switching power converter 80 operates in the pre-charging mode, the pre-charging circuit 801 is configured to operably control the switch Q1, so as to control an electrical connection relationship between the input voltage Vin and the capacitor C1 of the resonator 803, and is configured to operably control other switches Q2-Q10, so as to control the resonant capacitors C1 and C3 and the non-resonant capacitor C2 to be connected in parallel to one another in plural pre-charging sub-stages in the pre-charging mode, so that each one of the resonant capacitors C1 and C3 and the at least one non-resonant capacitor C2 is charged to a corresponding predetermined voltage. The pre-charging circuit 801 of this embodiment can be implemented as the configuration of the pre-charging circuit shown in FIG. 3 or FIG. 4. In a pre-charging sub-stage of the pre-charging mode, the pre-charging control circuit of this embodiment is configured to operably charge the resonant capacitors C1 and C3 and the at least one non-resonant capacitor C2 to the predetermined voltage according to a rising speed of the rising ramp signal. In one embodiment, as shown in FIG. 8A, in a first pre-charging sub-stage, according to a pre-charging control signal P1 generated by the pre-charging circuit 801, the switches Q1-Q4, Q6, Q8 and Q10 are controlled to be ON, whereas, the switches Q5, Q7 and Q9 are controlled to be OFF, thus controlling the resonant capacitors C1 and C3 and the at least one non-resonant capacitor C2 to be connected in parallel to one another, and to thereby charge the resonant capacitors C1 and C3 and the at least one non-resonant capacitor C2 to a predetermined voltage, wherein the predetermined voltage can be, for example but not limited to, ¼ of the input voltage Vin. Next, as shown in FIG. 8B, in one embodiment, in a second pre-charging sub-stage, according to a pre-charging control signal P2 generated by the pre-charging circuit 801, the switches Q1-Q2, Q6, Q8 and Q10 are controlled to be ON, whereas, the switches Q3, Q4, Q5, Q7 and Q9 are controlled to be OFF, thus controlling the resonant capacitor C1 and the at least one non-resonant capacitor C2 to be connected in parallel to each other, and to thereby charge the resonant capacitor C1 and the at least one non-resonant capacitor C2 to a predetermined voltage, wherein the predetermined voltage can be, for example but not limited to, ½ of the input voltage Vin. Further next, as shown in FIG. 8C, in one embodiment, in a third pre-charging sub-stage, according to a pre-charging control signal P3 generated by the pre-charging circuit 801, the switches Q1, Q6, Q8 and Q10 are controlled to be ON, whereas, the switches Q2, Q3, Q4, Q5, Q7 and Q9 are controlled to be OFF, thus charging the resonant capacitor C1 to a predetermined voltage, wherein the predetermined voltage can be, for example but not limited to, ¾ of the input voltage Vin. The aforementioned predetermined voltages for example have a ratio relationship with the input voltage, such as ¼, ½ or ¾ of the input voltage Vin. The switch Q1 is electrically connected to a node between the input voltage Vin and the resonant capacitor C1.

Figure 8D:
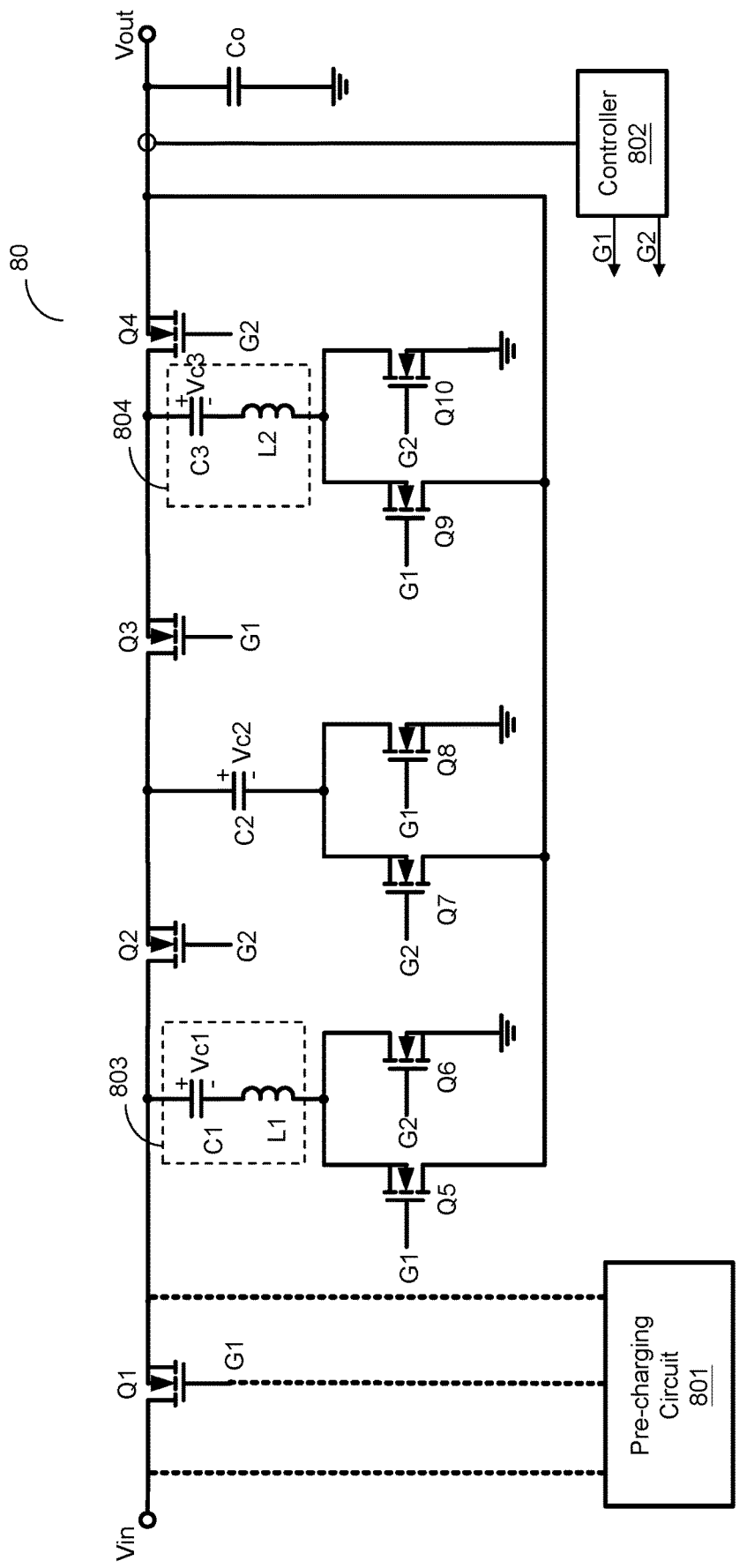

As shown in FIG. 8D, in one embodiment, the controller 802 is configured to operably generate a first resonant operation signal G1 corresponding to a first resonant process in the resonant voltage conversion mode and is configured to operably generate a second resonant operation signal G2 corresponding to a second resonant process in the resonant voltage conversion mode, so as to operate the switches Q1-Q10 in the resonant voltage conversion mode to switch electrical connection relationships of the resonant capacitors C1 and C3 and the at least one non-resonant capacitor C2. The resonant switching power converter 80 includes at least one resonator (e.g., resonator 803 and resonator 804), wherein the resonator 803 includes a resonant capacitor C1 and a resonant inductor L1 which are connected in series to each other, whereas, the resonator 804 includes a resonant capacitor C3 and a resonant inductor L2 which are connected in series to each other. The switches Q1-Q10 are coupled to the at least one resonator (e.g., resonator 803 and resonator 804). In the resonant voltage conversion mode, the switches Q1-Q10 are configured to operably switch electrical connection relationships of the resonator 803 and resonator 804 according to the first resonant operation signal G1 and the second resonant operation signal G2 in correspondence to the first resonant process and the second resonant process, respectively. In the first resonant process, a resonant charging operation is performed on the resonator 803 and resonator 804. In a second resonant process, a resonant discharging operation is performed on the resonator 803 and resonator 804. The electrical connection relationship of the non-resonant capacitor C2 with the at least one resonator (e.g., resonator 803 and resonator 804) is controlled according to the first resonant operation signal G1 and the second resonant operation signal G2. The voltage across the at least one non-resonant capacitor C2 has a constant ratio to the input voltage Vin. For example, in this embodiment, the voltage across the at least one non-resonant capacitor C2 is ½ of the input voltage Vin. After the pre-charging mode ends, the resonant switching power converter 80 will subsequently operate in the resonant voltage conversion mode. The first resonant process and the second resonant process are arranged at different periods in a repeated, alternating manner, to convert the input voltage Vin to an output voltage Vout. In the resonant voltage conversion mode, the first resonant operation signal G1 and the second resonant operation signal G2 have respective ON periods which do not overlap one another, so that the first resonant process and the second resonant process do not overlap each other.

In the first resonant process, according to first resonant operation signal G1, the switches Q1, Q3, Q5, Q8 and Q9 are controlled to be ON, whereas, the switches Q2, Q4, Q6, Q7 and Q10 are controlled to be OFF, so that a series connection of the resonant capacitor C1 of the resonator 803 and the resonant inductor L1 is formed between the input voltage Vin and the output voltage Vout and so that a series connection of the non-resonant capacitor C2, the resonant capacitor C3 of the resonator 804 and the resonant inductor L2 is formed between a ground voltage level and the output voltage Vout, and to thereby charge the resonant capacitors C1 and C3 and to thereby discharge the non-resonant capacitor C2. In the second resonant process, according to second resonant operation signal G2, the switches Q2, Q4, Q6, Q7 and Q10 are controlled to be ON, whereas, the switches Q1, Q3, Q5, Q8 and Q9 are controlled to be OFF, so that a series connection of the non-resonant capacitor C2, the resonant capacitor C1 of the resonator 803 and the resonant inductor L1 is formed between a ground voltage level and the output voltage Vout and so that a series connection of the resonant capacitor C3 of the resonator 804 and the resonant inductor L2 is formed between a ground voltage level and the output voltage Vout, and to thereby discharge the resonant capacitors C1 and C3 and to thereby charge the non-resonant capacitor C2.

In regard to how the resonators 803 and 804 of the resonant switching power converter 80 shown in FIGS. 8A-8D operate, this is well known to those skilled in the art, so the details thereof are not redundantly explained here. In one embodiment according to the present invention, the entire circuit of the resonant switching power converter 80 shown in the figure (except the input voltage Vin) can support hot-swapping operation.

Figure 9A:
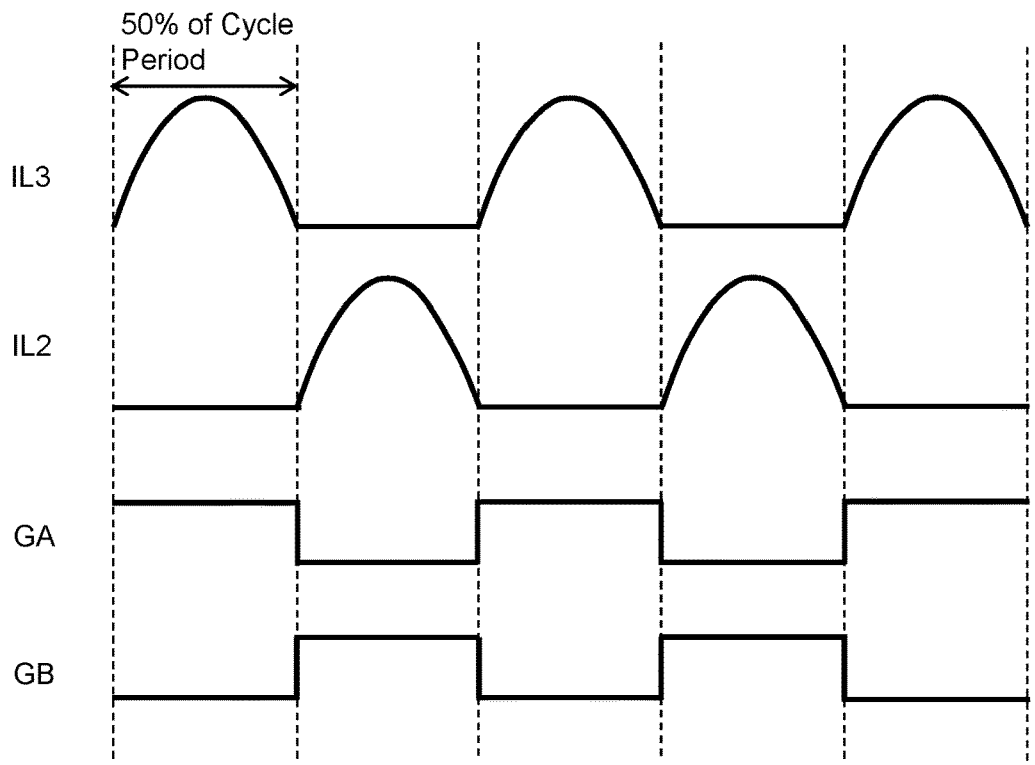
FIG. 9A, FIG. 9B and FIG. 9C illustrate waveforms of operation signals and inductor currents in correspondence to charging and discharging processes.

Please refer to FIG. 9A, which illustrate waveforms of operation signals and inductor currents in correspondence to a resonant process and resonant discharging processes. Please refer to FIG. 9A in conjugation with FIG. 5A. In the embodiment shown in FIG. 9A, the charging operation signal GA corresponding to the switches Q1~Q4 are at high level in the charging process, whereas, the discharging operation signal GB corresponding to the switches Q5~Q10 are at high level in the discharging process. In the embodiment shown in FIG. 9A, the duration period of the above-mentioned charging process is substantially equal to 50% of the cycle period (i.e., duty ratio=50%). As a consequence, the switch Q1 can be switched at a time point at which the current flowing through the switch Q1 is at a relatively lower level of its positive half wave (i.e., the switch Q1 can be switched at a time point at which the current flowing through the charging inductor L3 is zero), so that soft switching can be achieved. In one embodiment, zero current switching (ZCS) can be achieved.

Figure 9B:
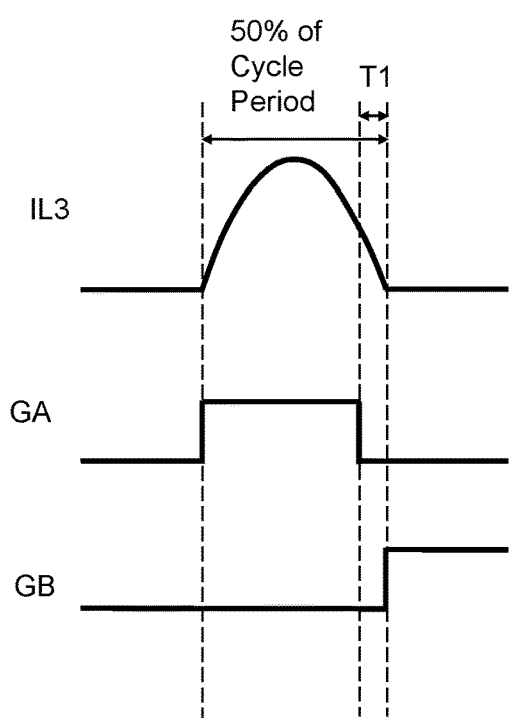
Figure 9C:
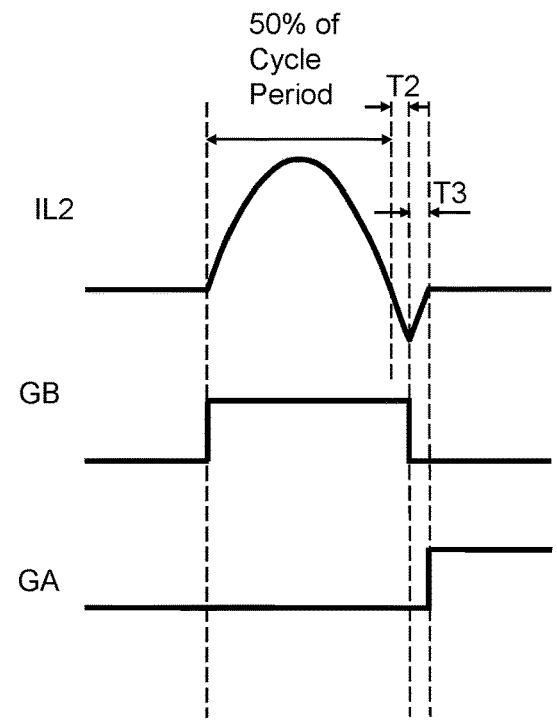

Please refer to FIG. 9B and FIG. 9C, which illustrate waveforms of operation signals and inductor currents in correspondence to a first resonant process and resonant discharging processes. Please refer to FIG. 9B and FIG. 9C along with FIG. 5A. In the embodiment shown in FIG. 9B, the charging operation signal GA corresponding to the switches Q1~Q4 are at high level in the charging process, whereas, the discharging operation signal GB corresponding to the switches Q5~Q10 are at high level in the discharging process. In the embodiment shown in FIG. 9B, the duration period of the above-mentioned charging process is substantially smaller than 50% of the cycle period (i.e., duty ratio=50%) by a predetermined period T1. Thus, after the switches Q1~Q4 have been turned OFF, a little amount of current remains, which flows through the charging inductor L3 to take away accumulated charges stored in a parasitic capacitor of the switch Q10 via the parasitic diode of the switch Q4, so that the voltage across the switch Q10 can be reduced, thus achieving soft switching. In one preferred embodiment, the predetermined period T1 can be adjusted, to achieve zero voltage switching (ZVS). Please refer to FIG. 9C in conjugation with FIG. 5A. In the embodiment shown in FIG. 9C, the charging operation signal GA corresponding to the switches Q1~Q4 are at high level in the charging process, whereas, the discharging operation signal GB corresponding to the switches Q5~Q10 are at high level in the discharging process. In the embodiment shown in FIG. 9C, the duration period of the above-mentioned discharging process is substantially greater than 50% of the cycle period (i.e., duty ratio=50%) by a predetermined period T2. Thus, during the delayed turned-OFF period of the switches Q5-Q10, a negative current of the discharging inductor L2 will flow through a parasitic diode of the switch Q5, to charge a parasitic capacitor of the switch Q1. As a result, the voltage across the switch Q1 will be reduced, for achieving soft switching. In one preferred embodiment, the predetermined period T2 can be adjusted, to achieve zero voltage switching (ZVS). It is noteworthy that, in one embodiment, the embodiment of FIG. 9B and the embodiment of FIG. 9C can be implemented together or alone.

Figure 9D:
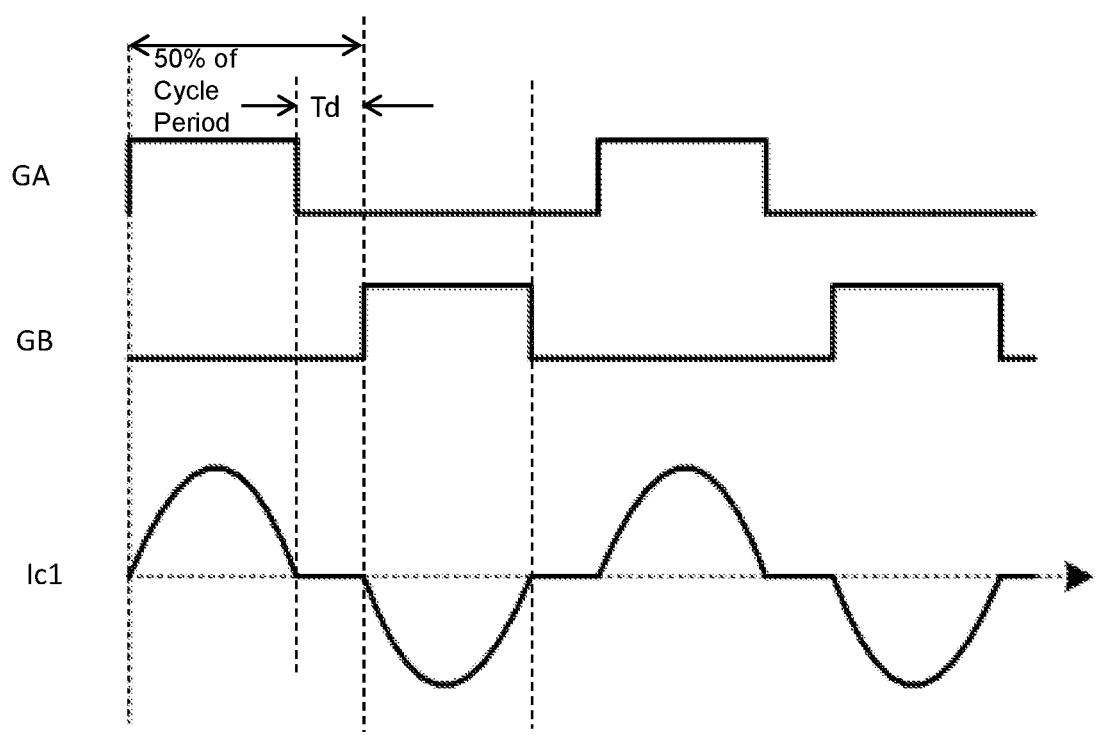
FIG. 9D illustrates waveforms of operation signals and capacitor currents in correspondence to charging and discharging processes.

Besides, please refer to FIG. 9D, which illustrates waveforms of operation signals and capacitor currents in correspondence to a resonant process and resonant discharging processes according to the present invention. Please refer to FIG. 9D in conjugation with FIG. 5A. As shown in FIG. 9D, in one embodiment, the duration period of the charging process and the duration period of the discharging process can be adjusted; for example, a delayed period Td can be provided in between. Under such situation, this embodiment can more flexibly adjust a ratio of the input voltage Vin to the output voltage Vout and the resonant frequency.

The present invention has provided a resonant switching power converter as described above. Advantages of the present invention include: that the present invention can achieve pre-charging operation mode and hot-swapping function without requiring an additional hot-swapping switch and an additional hot-swapping controller; that the present invention can achieve soft starting without requiring an additional upstream voltage regulator; that the present invention can reduce unwanted inrush current; that the present invention can reduce voltage stress; and that the present invention can support parallel operation, suitable to be applied in a multiphase resonant switched-capacitor converter (RSCC).

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert an input voltage to an output voltage; the resonant switching power converter comprising:
    a plurality of capacitors;
    a plurality of switches, which are coupled to the plurality of capacitors, wherein the plurality of switches are configured to operably switch electrical connection relationships of the plurality of capacitors;
    at least one charging inductor, which is connected in series to at least one of the plurality of capacitors;
    at least one discharging inductor, which is connected in series to at least one of the plurality of capacitors; and
    a pre-charging circuit, wherein when the resonant switching power converter operates in a pre-charging mode, the pre-charging circuit being configured to operably control a first switch of the plurality of switches, so as to control an electrical connection relationship between the input voltage and a first capacitor of the plurality of capacitors, and being configured to operably control other switches of the plurality of switches, so as to control the plurality of capacitors to be connected in parallel to one another or to be connected in series to one another, so that when a voltage drop across the first capacitor is lower than a predetermined voltage, a voltage drop across each capacitor is charged to the predetermined voltage;
    wherein the first switch is electrically connected between the input voltage and the first capacitor;
    wherein in a resonant voltage conversion mode, a charging operation signal and at least one discharging operation signal are generated to operate the plurality of switches, so as to switch electrical connection relationships of the plurality of capacitors, such that after the pre-charging mode ends, the resonant switching power converter subsequently operates in the resonant voltage conversion mode to convert the input voltage to the output voltage;
    wherein in the resonant voltage conversion mode, the charging operation signal and the at least one discharging operation signal have respective ON periods which do not overlap one another, so that a charging process and at least one discharging process do not overlap each other;

wherein in the charging process, the charging operation signal is configured to operably control the plurality of switches, so that a series connection of the plurality of capacitors and the at least one charging inductor is formed between the input voltage and the output voltage, to form a charging path;

wherein in the at least one discharging process, the at least one discharging operation signal is configured to operably control the plurality of switches, so that a series connection of each capacitor and one of the at least one discharging inductor is formed between the output voltage and a ground voltage level, to simultaneously or sequentially form a plurality of discharging paths;

wherein the charging process and the at least one discharging processes are arranged in a repeated, alternating manner, so as to convert the input voltage to the output voltage.

2. The resonant switching power converter of claim 1, wherein the predetermined voltage is a target voltage of the output voltage.

3. The resonant switching power converter of claim 2, wherein the pre-charging circuit includes:
an amplifier circuit, which is configured to operably generate an error amplification signal according to a voltage at a switch output end of the first switch and a rising ramp signal, wherein the switch output end is electrically connected to the first capacitor;
a ramp circuit, which is configured to operably generate the rising ramp signal; and
a pre-charging control circuit, which is configured to operably generate a pre-charging signal according to the error amplification signal, so as to control the first switch, so that in the pre-charging mode, each capacitor is charged to the predetermined voltage according to a rising speed of the rising ramp signal.

4. The resonant switching power converter of claim 3, wherein the pre-charging circuit further includes:
a voltage detection circuit, which is coupled between the pre-charging control circuit and the input voltage and which is configured to operably detect the input voltage, wherein when the input voltage is greater than a reference voltage, the voltage detection circuit is configured to operably enable the pre-charging control circuit, so as to actuate the pre-charging mode.

5. The resonant switching power converter of claim 1, wherein the pre-charging circuit further includes:
a pre-discharging circuit, which is configured to operably discharge each capacitor to the predetermined voltage in a case where the voltage drop across the first capacitor is greater than the predetermined voltage.

6. The resonant switching power converter of claim 1, wherein the at least one charging inductor is one single charging inductor and the at least one discharging inductor is one single discharging inductor.

7. The resonant switching power converter of claim 6, wherein an inductance of the one single charging inductor is the same as an inductance of the one single discharging inductor.

8. The resonant switching power converter of claim 6, wherein the charging process has a charging resonant frequency, whereas, the discharging process has a discharging resonant frequency, and wherein the charging resonant frequency is the same as the discharging resonant frequency.

9. The resonant switching power converter of claim 6, wherein the charging process has a charging resonant frequency, whereas, the discharging process has a discharging resonant frequency, and wherein the charging resonant frequency is different from the discharging resonant frequency.

10. The resonant switching power converter of claim 1, wherein the at least one charging inductor and the at least one discharging inductor is one same single inductor.

11. The resonant switching power converter of claim 1, wherein the charging process has a charging resonant frequency, whereas, the discharging process has a discharging resonant frequency, and wherein the charging resonant frequency is the same as the discharging resonant frequency.

12. The resonant switching power converter of claim 1, wherein the charging process has a charging resonant frequency, whereas, the discharging process has a discharging resonant frequency, and wherein the charging resonant frequency is different from the discharging resonant frequency.

13. The resonant switching power converter of claim 1, wherein the resonant switching power converter is a bidirectional resonant switching power converter.

14. The resonant switching power converter of claim 1, wherein a voltage conversion ratio of the input voltage to the output voltage of the resonant switching power converter is adjustable to be 4:1, 3:1 or 2:1.

15. The resonant switching power converter of claim 1, wherein the predetermined voltage has a constant ratio to the input voltage.

16. A resonant switching power converter, which is configured to operably convert an input voltage to an output voltage; the resonant switching power converter comprising:
at least one resonator, wherein the at least one resonator includes a resonant capacitor and a resonant inductor which are connected in series to each other;
a plurality of switches, which are coupled to the at least one resonator, wherein in a resonant voltage conversion mode, the plurality of switches are configured to operably switch electrical connection relationships of the at least one resonator according to a first resonant operation signal and a second resonant operation signal in correspondence to a first resonant process and a second resonant process, respectively; wherein in the first resonant process, a resonant charging operation is performed on the at least one resonator, and wherein in the second resonant process, a resonant discharging operation is performed on the at least one resonator;
at least one non-resonant capacitor, which is coupled to the at least one resonator and whose electrical connection relationship with the at least one resonator is controlled according to the first resonant operation signal and the second resonant operation signal in the resonant voltage conversion mode, wherein a voltage across the at least one non-resonant capacitor has a constant ratio to the input voltage; and
a pre-charging circuit, wherein when the resonant switching power converter operates in a pre-charging mode, the pre-charging circuit being configured to operably control a first switch of the plurality of switches so as to control an electrical connection relationship between the input voltage and the at least one resonator, and being configured to operably control other switches of the plurality of switches so as to control the electrical connection relationship between the at least one resonator and the at least one non-resonant capacitor in a plurality of sub-pre-charging stages in the pre-charging mode, so that the resonant capacitor and the at least one non-resonant capacitor are charged to respective predetermined voltages;

wherein the first switch is electrically connected between the input voltage and the first capacitor;

wherein in the resonant voltage conversion mode, the first resonant operation signal and the second resonant operation signal have respective ON periods which do not overlap one another, so that the first resonant process and the second resonant process do not overlap each other;

wherein after the pre-charging mode ends, the resonant switching power converter subsequently operates in the resonant voltage conversion mode, wherein the first resonant process and the second resonant process are arranged in a repeated, alternating manner, so as to convert the input voltage to the output voltage.

17. The resonant switching power converter of claim 16, wherein the pre-charging circuit includes:

an amplifier circuit, which is configured to operably generate an error amplification signal according to a voltage at a switch output end of the first switch and a rising ramp signal, wherein the switch output end is electrically connected to the first capacitor;

a ramp circuit, which is configured to operably generate the rising ramp signal; and a pre-charging control circuit, which is configured to operably generate a pre-charging signal according to the error amplification signal, so as to control the first switch, so that in the pre-charging mode, the resonant capacitor and the at least one non-resonant capacitor are charged to the respective predetermined voltages according to a rising speed of the rising ramp signal.

18. The resonant switching power converter of claim 17, wherein the pre-charging circuit further includes:

a voltage detection circuit, which is coupled between the pre-charging control circuit and the input voltage and which is configured to operably detect the input voltage, wherein when the input voltage is greater than a reference voltage, the voltage detection circuit is configured to operably enable the pre-charging control circuit, so as to actuate the pre-charging mode.

19. The resonant switching power converter of claim 16, wherein the predetermined voltage has a constant ratio to the input voltage.

\* \* \* \* \*